US012392074B2

(12) United States Patent
Chun et al.

(10) Patent No.: US 12,392,074 B2
(45) Date of Patent: Aug. 19, 2025

(54) WASHING MACHINE

(71) Applicant: Samsung Electronics Co., Ltd., Suwon-si (KR)

(72) Inventors: Kwang Min Chun, Suwon-si (KR); Hwa Shik Kim, Suwon-si (KR); Min Jea Choi, Suwon-si (KR); Nae Young Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/481,967

(22) Filed: Oct. 5, 2023

(65) Prior Publication Data

US 2024/0035220 A1 Feb. 1, 2024

Related U.S. Application Data

(63) Continuation of application No. 16/947,237, filed on Jul. 24, 2020, now Pat. No. 11,834,767, which is a (Continued)

(30) Foreign Application Priority Data

Jul. 29, 2015 (KR) ........................ 10-2015-0107288

(51) Int. Cl.
*D06F 37/10* (2006.01)
*D06F 34/10* (2020.01)
(Continued)

(52) U.S. Cl.
CPC .............. *D06F 37/10* (2013.01); *D06F 34/10* (2020.02); *D06F 37/28* (2013.01); *D06F 39/14* (2013.01); *E05D 11/0081* (2013.01); *D06F 34/04* (2020.02)

(58) Field of Classification Search
CPC .......... D06F 37/10; D06F 37/28; D06F 39/14; E05D 11/0081
See application file for complete search history.

(56) References Cited

U.S. PATENT DOCUMENTS 3,883,201 A 5/1975 Busoni
9,708,749 B2 7/2017 Woo et al.
(Continued)

FOREIGN PATENT DOCUMENTS

CH 715484 A2 4/2020
CL 2013-1505 A1 5/2018
(Continued)

OTHER PUBLICATIONS

Machine translation of KR 20150006264 A, dated Jan. 2015. (Year: 2015).
(Continued)

*Primary Examiner* — Michael E Barr
*Assistant Examiner* — Kevin G Lee

(57) ABSTRACT

Disclosed is a washing machine having an improved wire connection structure for electrically connecting electrical components. The washing machine includes a cabinet which has a first electrical component, forms an exterior, and has an opening through which laundry is inserted; a door provided with a second electrical component, and configured to open and close the opening; a wire which electrically connects the first electrical component and the second electrical component; and a hinge which has a wire guide portion for coupling the door to the cabinet so as to be rotatable about a rotating axis and for guiding the wire.

20 Claims, 18 Drawing Sheets

Related U.S. Application Data continuation of application No. 15/576,227, filed as application No. PCT/KR2016/007849 on Jul. 19, 2016, now Pat. No. 10,767,300.

(51) Int. Cl.

| | |
|---|---|
| ***D06F 37/28*** | (2006.01) |
| ***D06F 39/14*** | (2006.01) |
| ***E05D 11/00*** | (2006.01) |
| *D06F 34/04* | (2020.01) |

(56) References Cited

U.S. PATENT DOCUMENTS

| | | | | |
|---|---|---|---|---|
| 11,834,767 | B2 | 12/2023 | Chun et al. | |
| 2004/0144138 | A1 | 7/2004 | Takeuchi et al. | |
| 2006/0064846 | A1 | 3/2006 | Espindola et al. | |
| 2012/0096734 | A1 | 4/2012 | Moon et al. | |
| 2013/0127911 | A1 | 5/2013 | Brown | |
| 2015/0123523 | A1 | 5/2015 | Woo et al. | |
| 2017/0121898 | A1 | 5/2017 | Kwon et al. | |
| 2018/0038040 | A1 | 2/2018 | Kim et al. | |
| 2018/0127911 | A1 | 5/2018 | Chen et al. | |
| 2018/0216381 | A1 * | 8/2018 | Lee | E05D 7/00 |

FOREIGN PATENT DOCUMENTS

| | | | | |
|---|---|---|---|---|
| CN | 2495765 | Y | | 6/2002 |
| CN | 1517477 | A | | 8/2004 |
| CN | 101086194 | A | | 12/2007 |
| CN | 104674521 | A | | 6/2015 |
| CN | 105420996 | A | | 3/2016 |
| CN | 107532365 | A | | 1/2018 |
| DE | 10259980 | B3 | | 9/2004 |
| EP | 1389643 | A2 | | 2/2004 |
| EP | 2415920 | A1 | | 2/2012 |
| EP | 2868795 | A1 | | 5/2015 |
| EP | 3263757 | A1 | | 1/2018 |
| EP | 3330424 | B1 | | 2/2021 |
| JP | 2005-000583 | A | | 1/2005 |
| JP | 2012-075689 | A | | 4/2012 |
| KR | 10-2004-0015480 | A | | 2/2004 |
| KR | 10-2007-0002336 | A | | 1/2007 |
| KR | 10-2007-0027106 | A | | 3/2007 |
| KR | 10-2009-0096948 | A | | 9/2009 |
| KR | 10-2010-0027019 | A | | 3/2010 |
| KR | 10-1145598 | B1 | | 5/2012 |
| KR | 10-2013-0123544 | A | | 11/2013 |
| KR | 10-2013-0133135 | A | | 12/2013 |
| KR | 10-2015-0006264 | A | | 1/2015 |
| KR | 2015006264 | A | * | 1/2015 |
| KR | 10-2015-0051466 | A | | 5/2015 |
| KR | 10-2015-0073517 | A | | 7/2015 |
| WO | 2005108725 | A1 | | 11/2005 |
| WO | 2011063486 | A1 | | 6/2011 |
| WO | 2016173552 | A1 | | 11/2016 |
| WO | 2017014492 | A1 | | 1/2017 |

OTHER PUBLICATIONS

Written Report and Search Report in connection with Brazilian Application No. 112018000008-6 dated Jan. 6, 2020, 8 pages.
European Search Report in connection with European Application No. 19000498.6 dated Feb. 21, 2020, 10 pages.
Communication pursuant to Article 94(3) EPC in connection with European Application No. 16830743.7 dated Mar. 27, 2020, 50 pages.
Examination report in connection with Indian Application No. 201717046876 dated Jan. 21, 2020, 6 pages.
Office Action in connection with Indian Patent Application No. 201717046876 dated Jan. 21, 2020, 6 pages.
Office Action in connection with Chinese Patent Application No. 201680044434.9 dated Oct. 30, 2019, 25 pages.
Supplementary European Search Report in connection with European Application No. EP16830743.7 dated Jun. 14, 2019, 9 pages.
Examination report in connection with Chilean Application No. CL 201703149 dated May 31, 2019, 13 pages.
Office Action in connection with Chilean Application No. CL201703149 dated Dec. 12, 2018, 13 pages.
Notice of Patent Allowance in connection with Korean Application No. KR10-2018-0033818 dated Dec. 24, 2018, 3 pages.
Office Action in connection with Iran Patent Application No. 1396501140003009101 dated Sep. 8, 2018, 2 pages.
Notice of Acceptance for patent application in connection with Australian Patent Application No. 2016300022 dated Sep. 24, 2018, 3 pages.
Examination report No. 1 for standard patent application in connection with Australian Application No. AU2016300022 dated May 22, 2018, 6 pages.
Communication pursuant to Rules 161(2) and 162 EPC in connection with European Application No. 16830743.7 dated Apr. 13, 2018, 3 pages.
Detailed Ground(s) for Rejection in connection with Korean Application No. KR10-2018-0033818 dated Jun. 20, 2018, 6 pages.
Notice of Allowance in connection with Korean Patent Application No. 10-2015-0107288 dated Apr. 13, 2018, 7 pages.
Notice of Final Rejection in connection with Korean Patent Application No. 10-2015-0006264 dated Feb. 23, 2018, 5 pages.
Office Action in connection with Korean Application No. 10-2015-0107288 dated Aug. 21, 2017, 12 pages.
International Search Report in connection with International Application No. PCT/KR2016/007849 dated Oct. 27, 2016, 5 pages.
Written Opinion of the International Searching Authority in connection with International Application No. PCT/KR2016/007849 dated Oct. 27, 2016, 6 pages.
The Second Office Action in connection with Chinese Application No. 201680044434.9 dated Jun. 16, 2020, 9 pages.
Communication pursuant to Article 94(3) EPC in connection with European Application No. 19000498.6 dated Sep. 7, 2020, 4 pages.
Office Action dated Nov. 16, 2020 in connection with Chinese Patent Application No. 202010406271.2, 15 pages.
Office Action dated Oct. 13, 2020 in connection with Korean Patent Application No. 10-2019-0032834, 7 pages.
Written Opinion dated Dec. 2, 2020 in connection with Singapore Patent Application No. 10202000818U, 6 pages.
Office Action dated Dec. 1, 2020 in connection with Vietnamese Patent Application No. 1-2017-05291, 4 pages.
European Patent Office, "Communication pursuant to Article 94(3) EPC" issued Mar. 16, 2021, in connection with European Patent Application No. 19000498.6, 8 pages.
Korean Intellectual Property Office, "Results of Examination" issued Apr. 27, 2021, in connection with Korean Patent Application No. 10-2019-0032834, 4 pages.
Notice of Patent Allowance dated Jul. 26, 2021, in connection with Korean Application No. 10-2019-0032834, 5 pages.
Notice of Preliminary Rejection dated Feb. 13, 2022, in connection with Korean Application No. 10-2021-0143518, 8 pages.
Hearing Notice in Reference to Indian Application No. 201717046876 dated Jun. 28, 2022, 2 pages.
Office Action dated Apr. 25, 2022, in connection with Brazilian Application No. 112018000008-6, 5 pages.
Office Action dated Apr. 26, 2022, in connection with Mexican Application No. MX/a/2018/000383, 5 pages.
Notice of Final Rejection dated Aug. 29, 2022, in connection with Korean Application No. 10-2021-0143518, 5 pages.
Non-final Office Action dated Oct. 6, 2022, in connection with U.S. Appl. No. 17/582,000, 9 pages.
Final Office Action dated Apr. 12, 2023, in connection with U.S. Appl. No. 17/582,000, 10 pages.
Notice of Preliminary Rejection dated Aug. 7, 2023, in connection with Korean Application No. 10-2023-0036884, 6 pages.
Result of substantive examination dated Apr. 26, 2024, in connection with Vietnam Application No. 1-2021-04175, 4 pages.

* cited by examiner

WASHING MACHINE

CROSS-REFERENCE TO RELATED APPLICATIONS

This application is a continuation of application Ser. No. 16/947,237, filed Jul. 24, 2020, which is a continuation of application Ser. No. 15/576,227, filed Nov. 21, 2017, now U.S. Pat. No. 10,767,300, which is the 371 National Stage of International Application No. PCT/KR2016/007849, filed Jul. 19, 2016, which claims priority to Korean Application No. 10-2015-0107288, filed on Jul. 29, 2015, the disclosures of which are fully incorporated herein by reference into the present disclosure as if fully set forth herein.

BACKGROUND

1. Field

Embodiments of the present disclosure relate to a washing machine, and more particularly, to a washing machine provided with an improved wire connection structure capable of electrically connecting electrical components.

2. Description of Related Art

Generally, a washing machine is a device configured to wash laundry by rotating a rotating tub of a cylindrical shape, which accommodates the laundry and washing water. The washing machine includes a drum washing machine in which a rotating tub is horizontally disposed and configured to raise upward laundry along an inner circumferential surface thereof and drop the laundry downward when the rotating tub is rotated in forward and reverse directions about a horizontal axis, thereby washing the laundry; and a vertical washing machine in which a rotating tub provided with a pulsator therein is vertically arranged and configured to wash laundry using a water stream generated by the pulsator when the rotating tub is rotated in forward and reverse directions about a vertical axis.

The drum washing machine may include a cabinet configured to form an exterior, a cylindrical tub installed inside the cabinet and configured to accommodate washing water, a drum rotatably installed inside the tub and configured to wash laundry, a drive motor disposed in rear of the tub and configured to rotate the drum, and a door installed at a front surface of the cabinet. An opening communicating with the drum is provided at the cabinet, and the door is able to open and close the opening.

Generally, electrical components are disposed inside the cabinet. However, while washing machines having various designs are realized, there is a case in which electrical components disposed inside the cabinet and electrical components disposed at an outside of the cabinet are electrically connected using a wire.

SUMMARY

According to one aspect of the present disclosure, there is provided a washing machine with an improved structure capable of electrically connecting electrical components inside a door and electrical components inside a cabinet.

According to another aspect of the present disclosure, there is provided a washing machine with an improved structure capable of connecting electrical components inside a door and electrical components inside a cabinet using a wire without hindering an aesthetic exterior of the washing machine.

According to still another aspect of the present disclosure, there is provided a washing machine with an improved structure capable of allowing a wire to pass through a hinge assembly to electrically connect electrical components inside a door and electric components inside a cabinet.

A washing machine according to the spirit of the present disclosure may include a first electrical component; a cabinet configured to form an exterior and having an opening through which laundry is introduced; a door provided with a second electrical component and configured to open and close the opening; a wire configured to electrically connect the first electrical component and the second electrical component; and a hinge configured to couple the door to the cabinet to allow the door to be pivotable about a rotating axis, and having a wire guide portion configured to guide the wire.

The second electrical component may be provided inside the door.

The door may be pivotable about a single rotation axis.

The wire guide portion may be formed and recessed into the hinge to allow the wire to be insertable into the wire guide portion.

The wire guide portion may be formed to pass through the hinge.

The hinge may include a hinge body coupled to the cabinet; and at least one hinge arm extending from the hinge body and at which the wire guide portion is formed.

The at least one hinge arm may include a first surface facing the cabinet, and the wire guide portion may be formed and recessed along at least a portion of the first surface.

The at least one hinge arm may include a second surface that is directed downward in a rotating axis direction, and the wire guide portion may be formed and recessed along at least a portion of the second surface.

The hinge may further include at least one protrusion that is formed to protrude from the at least one hinge arm in a rotating axis direction to form the rotating axis.

The at least one protrusion may include a first protrusion formed to protrude upward from the at least one hinge arm in the rotating axis direction; and a second protrusion formed to protrude downward from the at least one hinge arm in the rotating axis direction, wherein a wire inlet may be formed on at least one of the first protrusion and the second protrusion to allow the wire to enter the wire guide portion.

A wire outlet may be formed at one surface of the hinge body, which faces the cabinet, to allow the wire to exit from the wire guide portion.

A through-hole may be formed at one surface of the cabinet to which the hinge body is coupled, and the wire exiting from the wire outlet may pass through the through-hole to enter the cabinet.

The hinge may include a hinge cover detachably coupled to the wire guide portion to prevent the wire, which is inserted into the wire guide portion, from being exposed to the outside.

The hinge may include a hinge body coupled to the cabinet; and at least one hinge arm extending from the hinge body toward a front side of the washing machine, wherein the wire guide portion may be formed to pass through the hinge body.

A washing machine according to the spirit of the present disclosure may include a cabinet configured to form an exterior and having an opening through which laundry is introduced; a door provided to open and close the opening; a hinge configured to pivotably couple the door to the cabinet; and a wire passing through the hinge, wherein one end portion of the wire may be positioned inside the door, and the other end portion thereof may include a wire that is positioned inside the cabinet.

A first electrical component may be provided inside the cabinet, a second electrical component may be provided inside the door, and the wire may electrically connect the first electrical component and the second electrical component.

A wire guide portion, through which the wire passes, may be formed and recessed into the hinge.

A wire guide portion, through which the wire passes, may be formed at the hinge and may pass therethrough.

The hinge may include a hinge body coupled to the cabinet; and at least one hinge arm extending from the hinge body and at which a wire guide portion through which the wire passes is formed.

The at least one hinge arm may include a first arm extending from the hinge body toward a front side of the washing machine; and a second arm extending from the first arm and bent toward an outside of the washing machine, wherein the wire guide portion may be formed and recessed along at least one of one surface of the first arm and one surface of the second arm.

The wire guide portion may be consecutively formed and recessed along at least one of the one surface of the first arm and the one surface of the second arm.

The door may be pivotable about a single rotating axis, and the hinge may further include at least one protrusion that is formed to protrude from the at least one hinge arm in a rotating axis direction to form the rotating axis.

The at least one hinge arm may include a first arm extending from the hinge body toward a front side of the washing machine; and a second arm extending from the first arm and bent toward outside the washing machine, wherein the at least one protrusion may be formed to protrude from the second arm in the rotating axis direction.

A wire inlet may be formed on at least one of the protrusions to allow the wire to enter the wire guide portion.

A wire outlet may be formed at one surface of the hinge body, which faces the cabinet, to allow the wire to exit from the wire guide portion.

The hinge may include a hinge cover detachably coupled to the wire guide portion to prevent the wire, which is inserted into the wire guide portion, from being exposed to the outside.

A washing machine according to the spirit of the present disclosure may include a cabinet having an opening through which laundry is introduced; a door provided with an electrical component and provided to open and close the opening; a wire electrically connected to the electrical component; and a hinge configured to couple the door to the cabinet and having a wire guide portion through which the wire passes.

The door may be pivotable about a single rotation axis.

While the electric components provided inside the door and the electric components provided inside the cabinet are connected by the wire, the wire is allowed to pass through the hinge such that the wire can be prevented from being significantly exposed to the outside.

The wire is inserted into the wire guide portion formed at the hinge such that the wire can pass through the hinge in a simple and easy manner.

The wire cover is coupled to the wire guide portion such that foreign materials can be prevented from flowing into the wire guide portion.

The wire cover detachably coupled to the wire guide portion is used and thus, while the wire is inserted into the wire guide portion, a work may be performed in a state in which the wire cover is removed such that work efficiency can be improved, and, when the wire is inserted into the wire guide portion, the wire cover is coupled to the wire guide portion such that the wire can be stably accommodated in a wire accommodating space.

DETAILED DESCRIPTION

Figure 1:
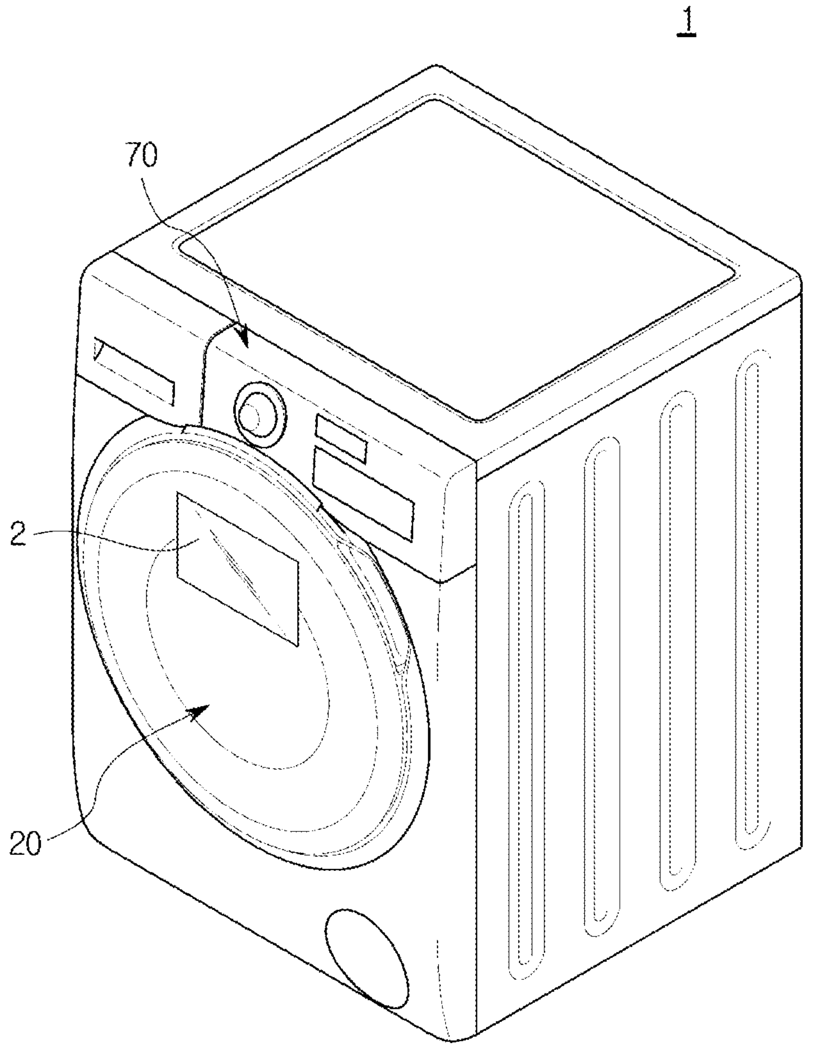
FIG. 1 is one exemplified diagram illustrating a state in which a display is applied to a washing machine according to one embodiment of the present disclosure.

Hereinafter, preferred embodiments of the present disclosure will be described in detail with reference to the accompanying drawings. Meanwhile, the terms used in the following description of a "front end," a "rear end," an "upper portion," a "lower portion," an "upper end," a "lower end," and the like are defined based on the drawing, and a shape and a position of each component are not limited by these terms.

An electrical component refers to an electrical and electronic component that receives power to operate. Also, the electrical component may also be used to include a power supply. The electrical component may include a first electrical component and a second electrical component, and detailed descriptions of the first electrical component and the second electrical component will be described below.

FIG. 1 is one exemplified diagram illustrating a state in which a display is applied to a washing machine according to one embodiment of the present disclosure.

As shown in FIG. 1, a display 2 may be applied to a washing machine 1. Specifically, the display 2 may be provided at a door 20 of the washing machine 1. The display 2 may display an operating state of the washing machine 1. Also, the display 2 may be implemented by a touch screen method so as to enable a user to easily select functions of the washing machine 1. Also, for convenience of the user, the display 2 may display a time, a temperature, and the like. In addition, the display 2 may display a picture, a photo, an image, and the like in consideration of design factors. At least one of the display 2 and a control panel 70 may be provided at the washing machine 1.

As shown in FIG. 1, when the display 2 is provided at the door 20 of the washing machine 1, at least some of various electrical components required for operating the display 2 may be provided inside the door 20. A circuit board configured to control an operating state of the display 2 may be one example of the electrical component.

Figure 2:
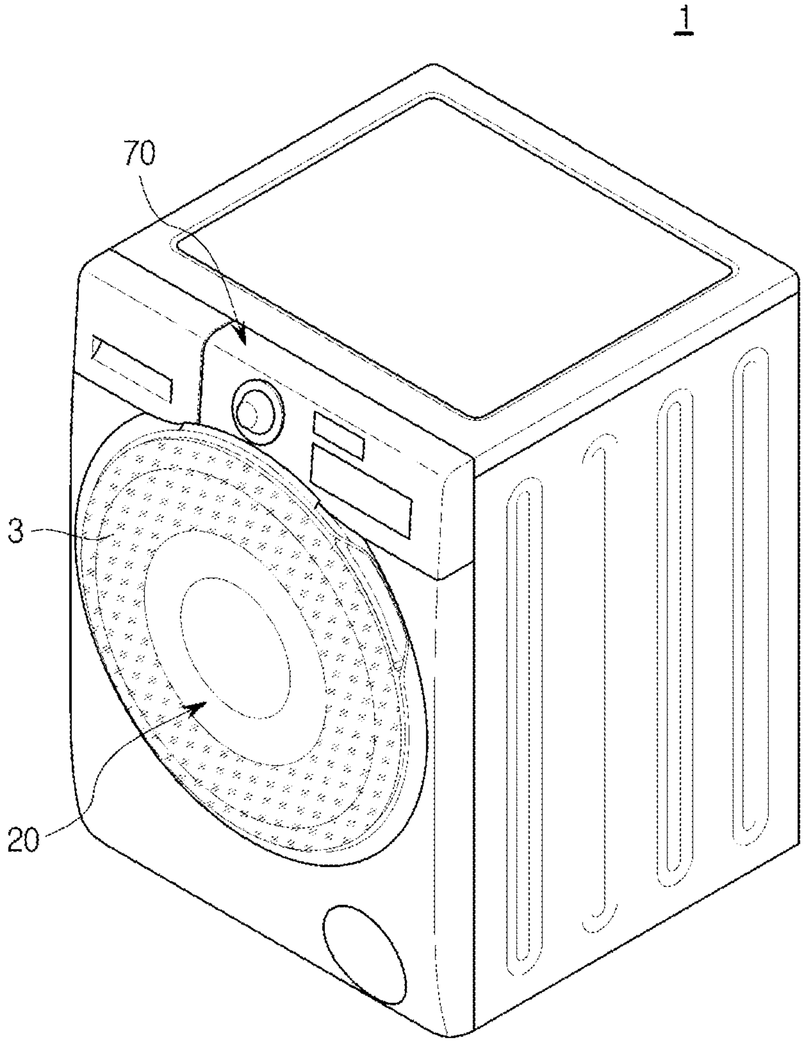
FIG. 2 is another exemplified diagram illustrating a state in which a light emitting portion is applied to the washing machine according to one embodiment of the present disclosure.

FIG. 2 is another exemplified diagram illustrating a state in which a light emitting portion is applied to the washing machine according to one embodiment of the present disclosure.

As shown in FIG. 2, a light emitting portion 3 may be applied to the washing machine 1. Specifically, the light emitting portion 3 may be provided at the door 20 of the washing machine 1. As one example, the light emitting portion 3 may be provided along an edge of the door 20. The light emitting portion 3 is provided at the door 20 of the washing machine 1 so that the washing machine 1 may be implemented to have a dynamic design.

As shown in FIG. 2, when the light emitting portion 3 is provided at the door 20 of the washing machine 1, at least some of various electrical components required to implement or operate the light emitting portion 3 may be provided inside the door 20. A light emitting element, such as a light emitting diode (LED), or a circuit board configured to control an operating state of the light emitting portion 3 may be one example of the electrical component.

As described above, various functions may be added to the door 20 of the washing machine 1 in consideration of user's convenience or a design aspect, and at least one of electrical components configured to implement the various functions may be provided inside the door 20.

Figure 3:
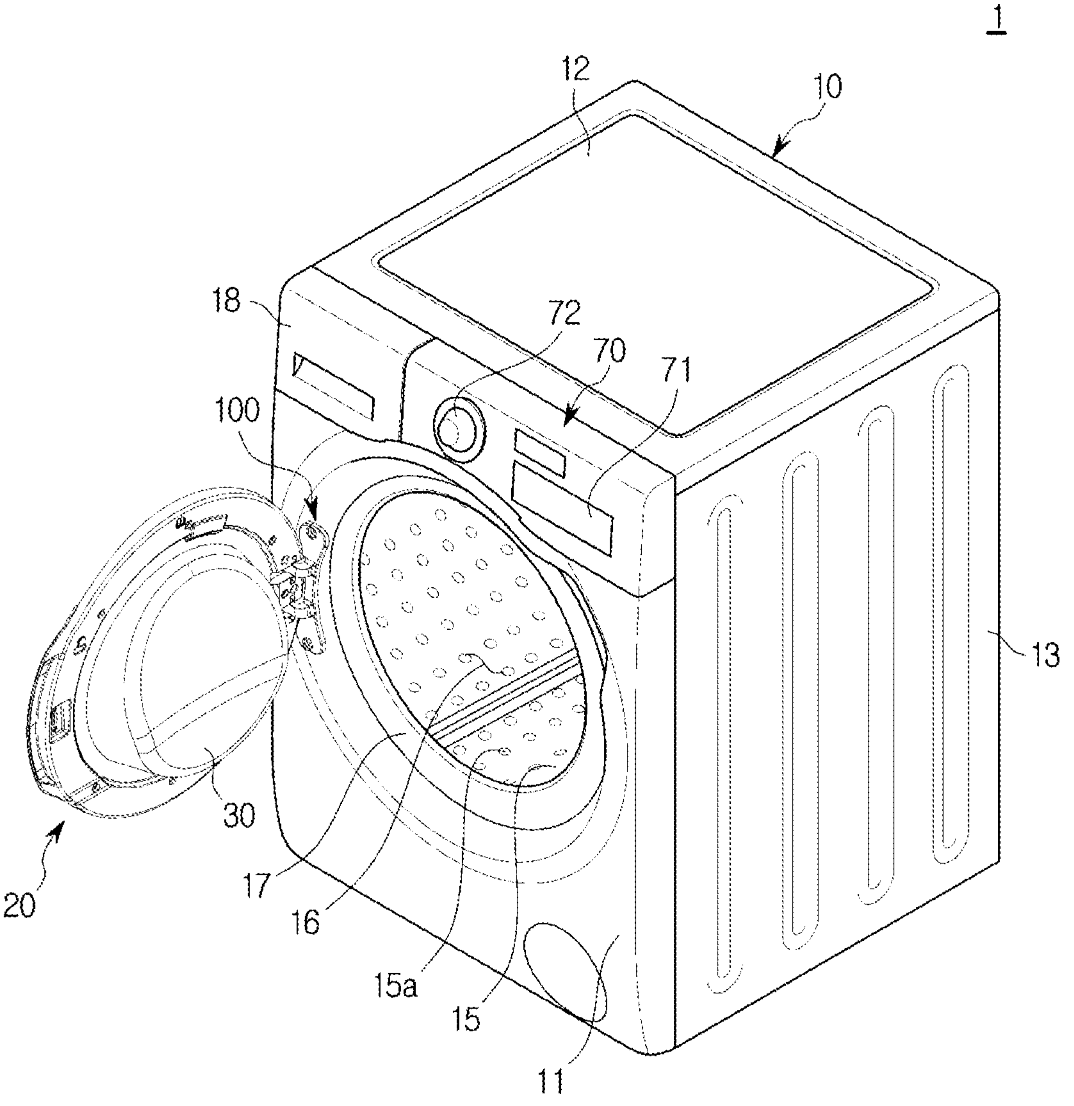
FIG. 3 is a perspective view illustrating a state in which a door of the washing machine according to one embodiment of the present disclosure is open.

FIG. 3 is a perspective view illustrating a state in which a door of the washing machine according to one embodiment of the present disclosure is open. FIG. 3 illustrates the washing machine 1 to which a hinge 100 according to a first example is applied.

As shown in FIG. 3, the washing machine 1 may include a cabinet 10 configured to form an exterior of the washing machine 1. The cabinet 10 may include a front surface frame 11 configured to form a front exterior of the washing machine 1, an upper surface frame 12 configured to form an upper exterior of the washing machine 1, a side frame 13 configured to form a side exterior of the washing machine 1, a lower surface frame (not shown) configured to form a lower exterior of the washing machine 1, and a rear frame (not shown) configured to form a rear exterior of the washing machine 1.

The washing machine 1 may further include a tub (not shown). The tub may be installed inside the cabinet 10 and may accommodate washing water.

The washing machine 1 may further include a drum 15. The drum 15 may be rotatably installed inside the tub. A plurality of spin-drying holes 15*a* may be formed at a wall surface of the drum 15. The drum 15 may be cylindrical in shape. An opening may be provided at a front surface portion of the drum 15 to allow laundry to enter and exit from the drum 15.

The washing machine 1 may further include the door 20. An opening 16 may be provided at the front surface frame 11 to allow laundry to enter and exit therefrom. The door 20 may be provided to open and close the opening 16. Specifically, the door 20 may be pivotably installed at the front surface frame 11 of the cabinet 10 to open and close the opening 16. The door 20 may be installed to be pivotable about a single rotating axis 195. The door 20 will be described in detail below.

A door contact portion 17 may be provided at the front surface frame 11 of the cabinet 10 to be in contact with the door 20 when the door 20 closes the opening 16. The door contact portion 17 may be formed and recessed inside the washing machine 1 and may be formed along an edge of the opening 16.

Also, the door contact portion 17 may be formed to correspond to a shape of the door 20. Accordingly, when the door 20 closes, a part protruding from a surface of the cabinet 10 may be minimized to improve the aesthetic exterior.

The washing machine 1 may further include a water supply pipe (not shown) and a detergent container 18. The water supply pipe may be installed over the tub to supply the washing water inside the tub. One side of the water supply pipe may be connected to a water supply valve (not shown), and the other side thereof may be connected to the detergent container 18.

The detergent container 18 is connected to the drum 15 through a connection pipe (not shown), and water supplied through the water supply pipe is supplied inside the drum 15 in association with a detergent via the detergent container 18.

The washing machine 1 may further include a drive motor (not shown). The drive motor may be provided in rear of the drum 15 to drive the drum 15.

The washing machine 1 may further include a drainage unit (not shown). The drainage unit may be provided below the cabinet 10 to discharge the washing water inside the tub to an outside of the washing machine 1. The drainage unit may include a drainage pump (not shown), a connection hose (not shown) configured to connect the tub and the drainage pump and allow the water inside the tub to flow into the drainage pump, and a drain hose (not shown) configured to guide the water pumped by the drainage pump to the outside of the washing machine 1.

The washing machine 1 may further include the control panel 70. The control panel 70 may be provided at an upper portion of the front surface frame 11 of the cabinet 10. The control panel 70 may include a display window 71 configured to display the operating state of the washing machine 1, and a manipulation portion 72 provided to allow a user to manipulate the operating state of the washing machine 1.

The washing machine 1 may further include the hinge 100. The hinge 100 may couple the door 20 to the cabinet 10. In other words, the hinge 100 may pivotably couple the door 20 to the cabinet 10. The hinge 100 will be described in detail below.

Figure 10:
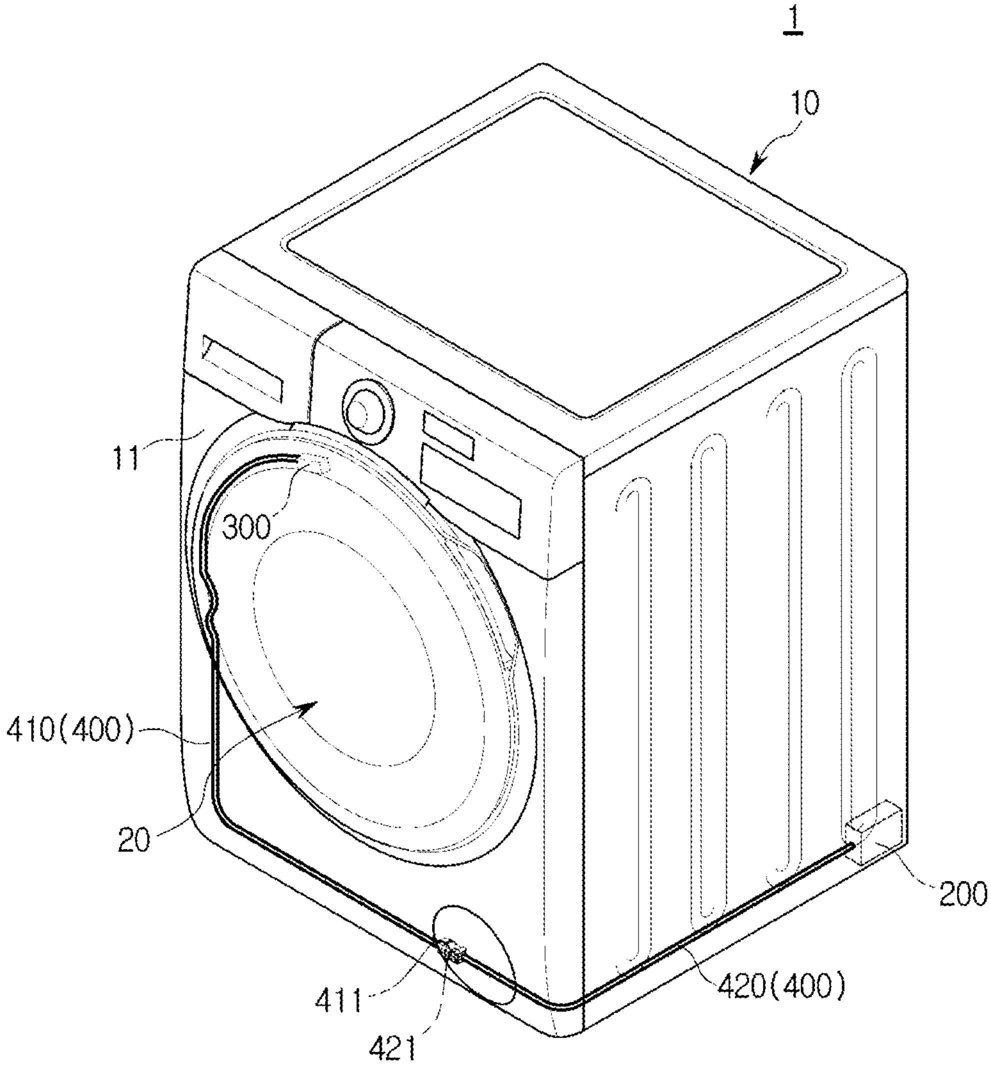
FIG. 10 is a diagram schematically illustrating a connection state of a wire in the washing machine according to one embodiment of the present disclosure.

The washing machine 1 may further include a first electrical component 200 (See, FIG. 10). The first electrical component 200 may be provided at the cabinet 10. Preferably, the first electrical component 200 may be provided inside the cabinet 10.

The first electrical component 200 may include, for example, a main printed circuit board (PCB), a sub PCB, a water supply valve, a drive motor, a power supply device, and the like. The main PCB may be disposed inside the cabinet 10. Specifically, the main PCB may be disposed at a bottom surface of a rear side of the cabinet 10. In other words, the main PCB may be disposed in rear of the drum 15. The main PCB may control operating states of a microcomputer, the water supply valve, the drive motor, and the like. Also, the main PCB may control an operating state of a second electrical component 300. The sub PCB may be disposed inside the control panel 70. The sub PCB may control operating states of the display window 71, the manipulation portion 72, and the like, which are provided at the control panel 70. Positions of the main PCB and the sub PCB are not limited to the above-described examples and may be variously changed. Hereinafter, as an example of the first electrical component 200, the main PCB will be mainly described.

The washing machine 1 may further include the second electrical component 300 (See, FIG. 10). The second electrical component 300 may be provided outside the cabinet 10. As one example of a position at which the second electrical component 300 is provided, the second electrical component 300 may be provided at the door 20. Preferably, the second electrical component 300 may be provided inside the door 20. As described in FIGS. 1 and 2, the second electrical component 300 may include, for example, a circuit board configured to control an operating state of the display 2 (See, FIG. 1), a light emitting element such as an LED, a circuit board configured to control an operating state of the light emitting portion 3 (See, FIG. 2), and the like.

The washing machine 1 may further include a wire 400 (See, FIG. 10). The wire 400 may connect the first electrical component 200 and the second electrical component 300. Specifically, the wire 400 may electrically connect the first electrical component 200 and the second electrical component 300. The wire 400 will be described in detail below.

Figure 4:
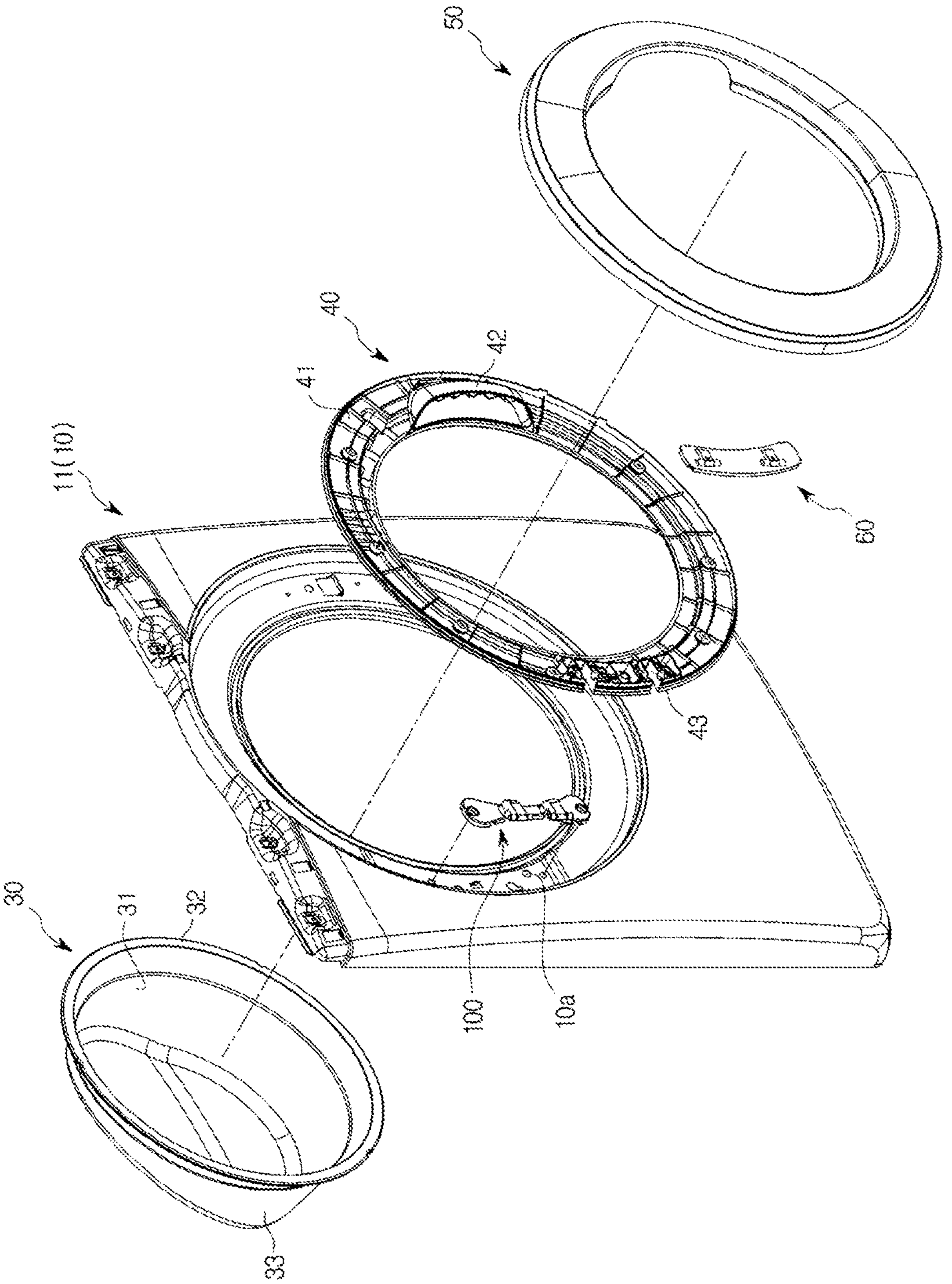
FIG. 4 is an exploded perspective view illustrating a coupling relationship between the door and a hinge of the washing machine according to one embodiment of the present disclosure.
Figure 5:
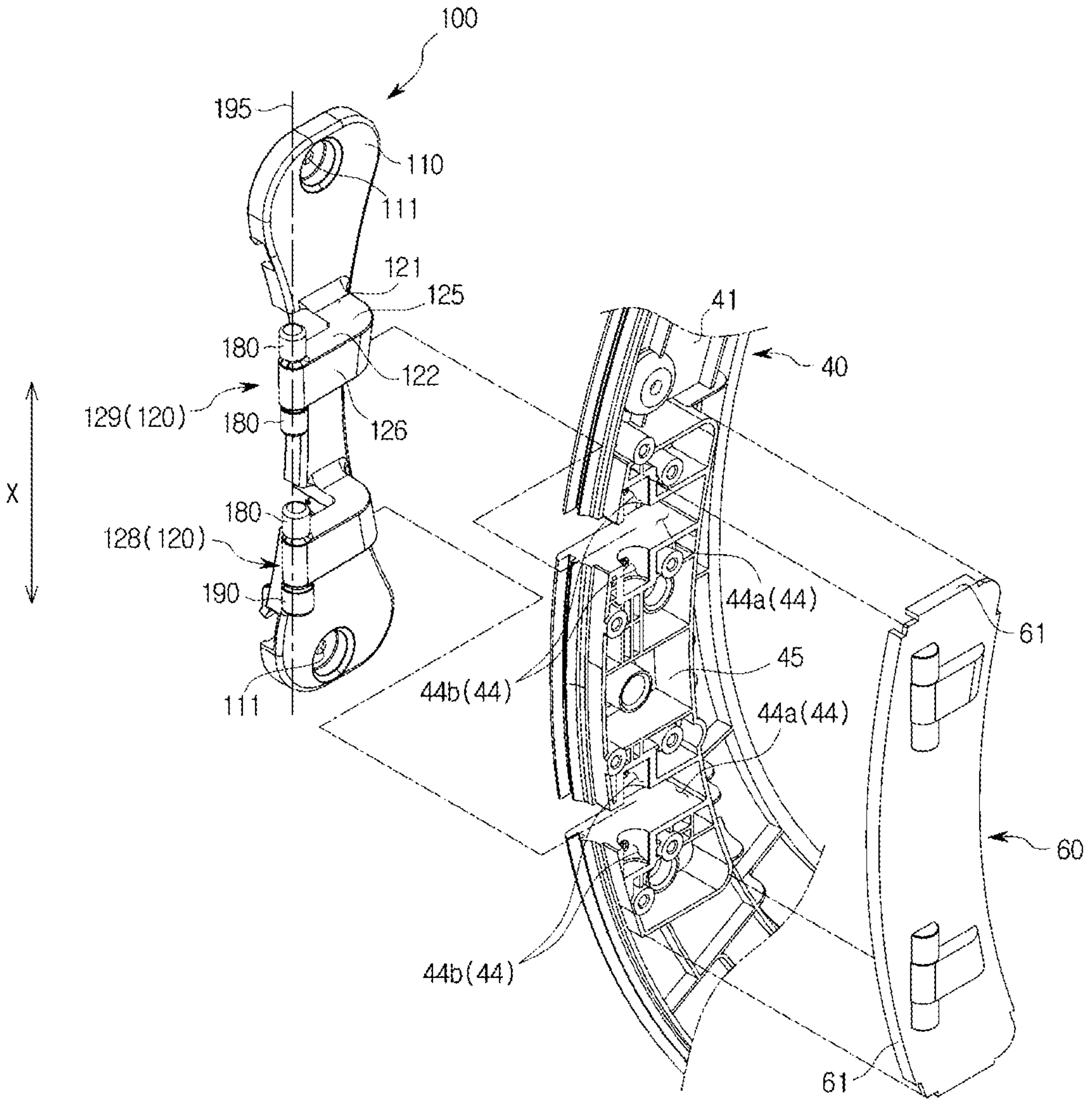
FIG. 5 is an enlarged diagram of a part of FIG. 4.
Figure 6:
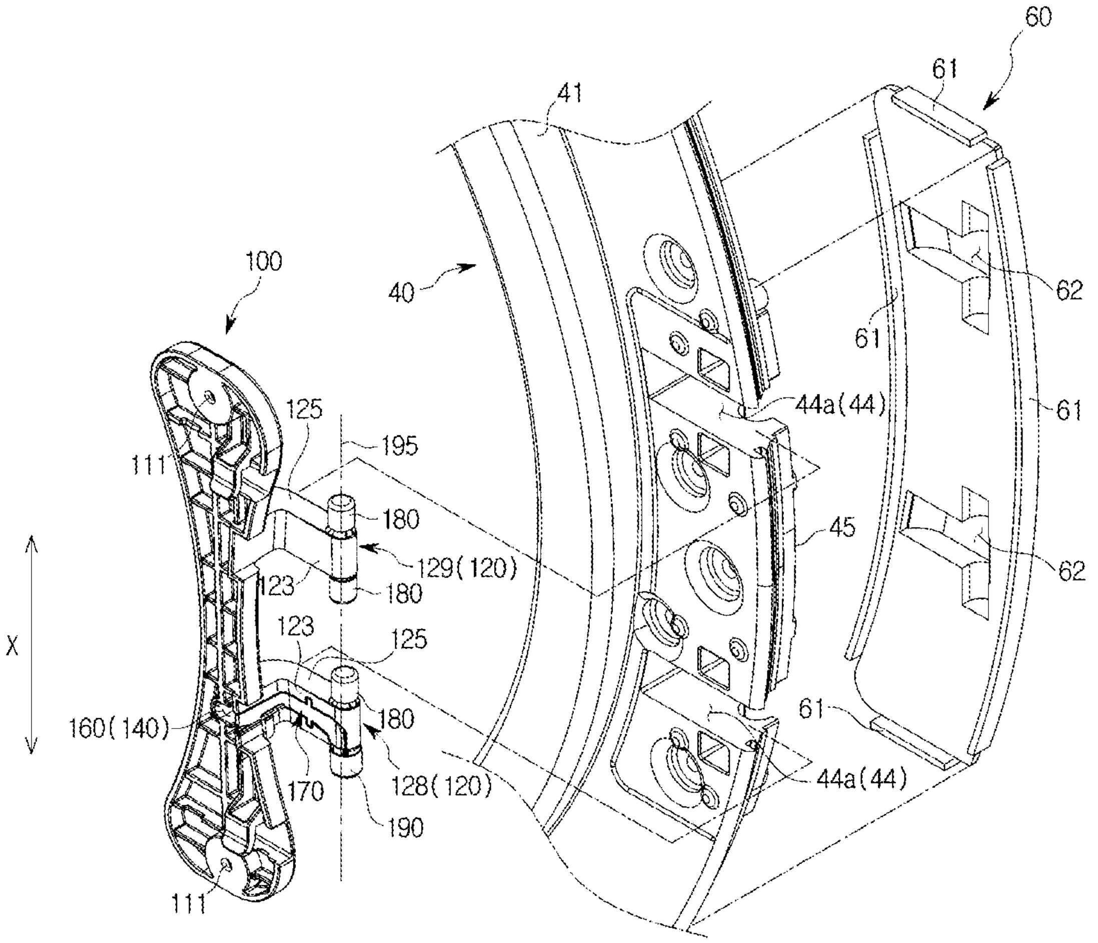
FIG. 6 is a diagram illustrating FIG. 5 when viewed at a different angle.
Figure 7:
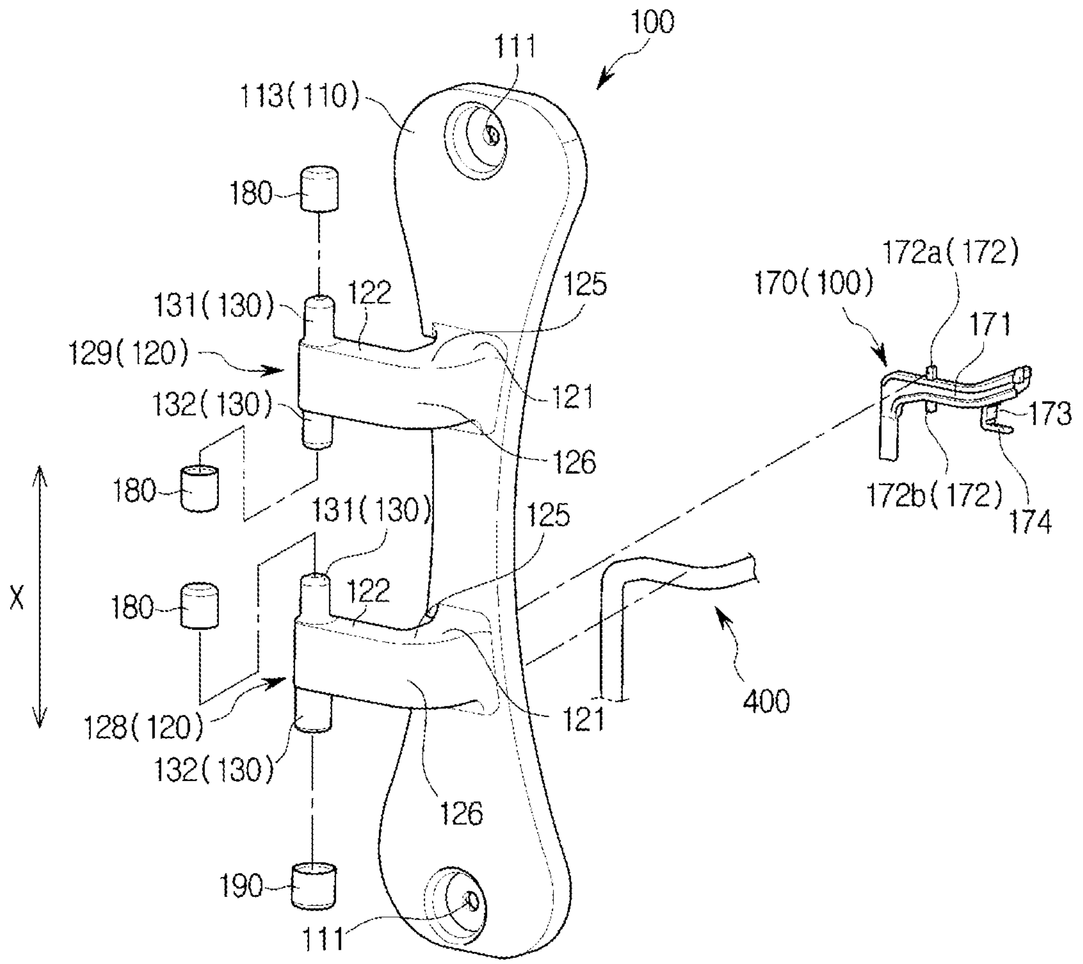
FIG. 7 is an exploded perspective view illustrating a hinge according to a first example in the washing machine according to one embodiment of the present disclosure.
Figure 8:
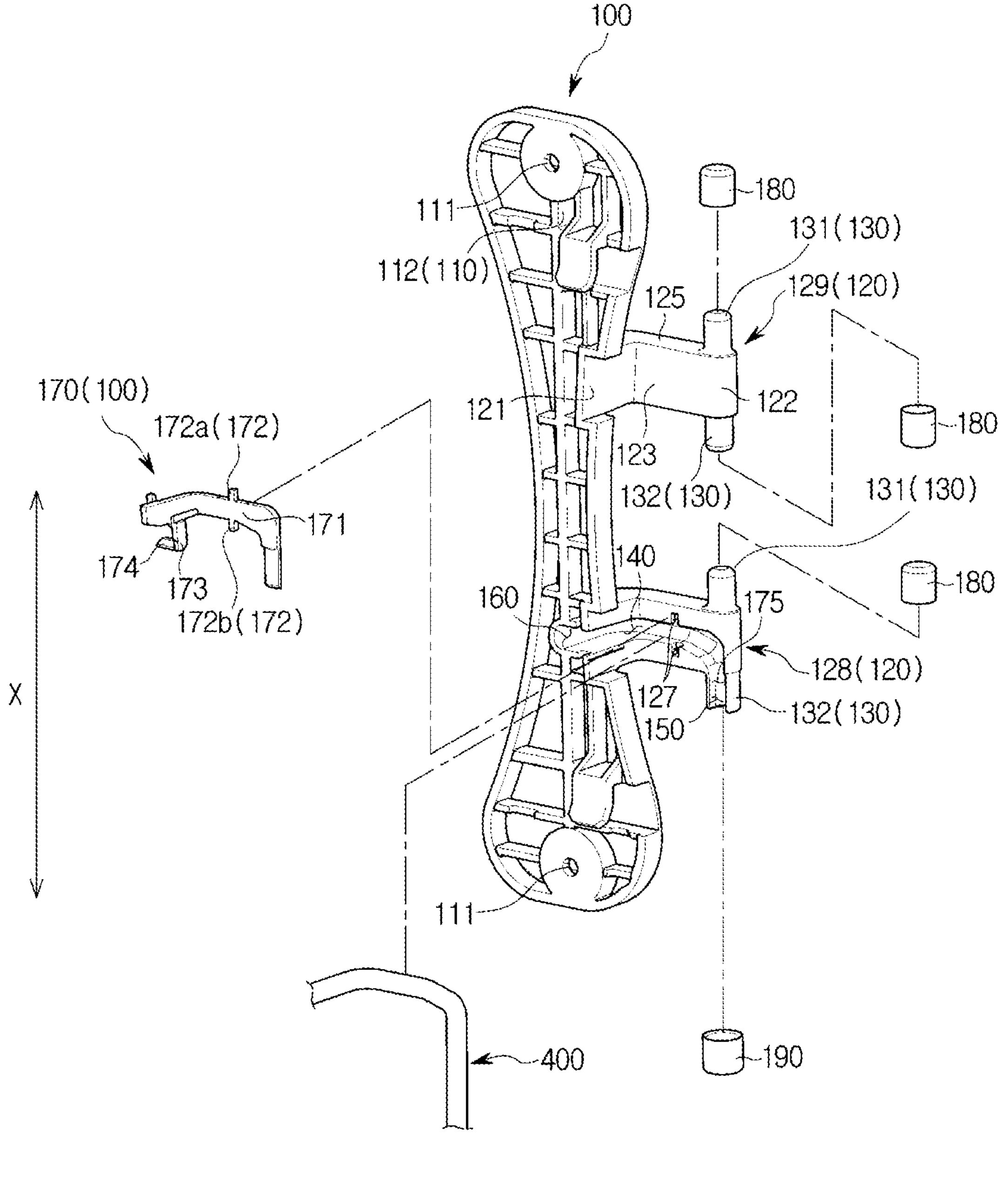
FIG. 8 is an exploded perspective view illustrating the hinge according to the first example shown in FIG. 7 when viewed at a different angle in the washing machine according to one embodiment of the present disclosure.
Figure 9:
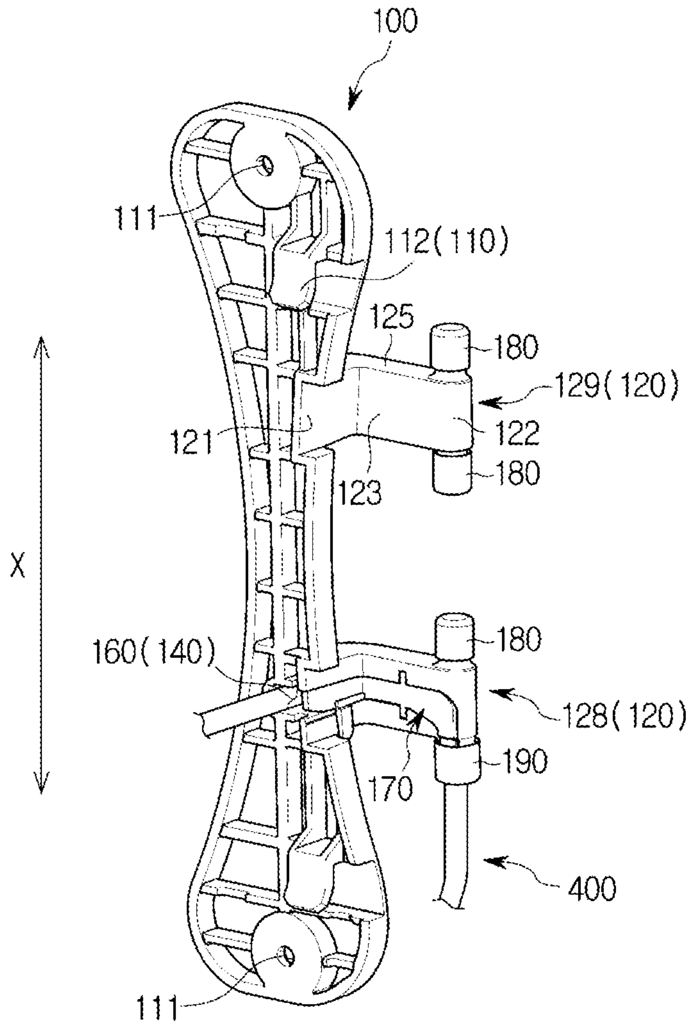
FIG. 9 is a diagram illustrating a coupling structure of the hinge according to the first example in the washing machine according to one embodiment of the present disclosure.

FIG. 4 is an exploded perspective view illustrating a coupling relationship between the door and a hinge of the washing machine according to one embodiment of the present disclosure, and FIG. 5 is an enlarged diagram of a part of FIG. 4. FIG. 6 is a diagram illustrating FIG. 5 when viewed at a different angle, and FIG. 7 is an exploded perspective view illustrating a hinge according to a first example in the washing machine according to one embodiment of the present disclosure. FIG. 8 is an exploded perspective view illustrating the hinge according to the first example shown in FIG. 7 when viewed at a different angle in the washing machine according to one embodiment of the present disclosure, and FIG. 9 is a diagram illustrating a coupling structure of the hinge according to the first example in the washing machine according to one embodiment of the present disclosure. FIGS. 4 to 6 illustrate the washing machine 1 to which the hinge 100 according to the first example is applied.

As shown in FIGS. 4 to 9, the door 20 may include a door glass 30 provided to allow the user to verify an inside of the drum 15; a glass holder 40 to which the door glass 30 is coupled, and at which an accommodating recess 44 is formed, the accommodating recess 44 having one side in which or to which at least a portion of the hinge 100 is accommodated or coupled; a door cover 50 configured to cover a front surface of the glass holder 40; and a cover plate 60 positioned between the glass holder 40 and the door cover 50, and configured to form a receiving portion (not shown) covering the accommodating recess 44 to accommodate the accommodating recess 44 and the at least a portion of the hinge 100.

The door glass 30 may be formed of a transparent plastic material to allow the user to visually verify a washing process.

The door glass 30 may include a cylindrical glass body 31 having an open front side, a flange 32 formed along an outer circumferential surface of the glass body 31 to be coupled to the glass holder 40, and a guide portion 33 inclinedly formed behind the glass body 31 and configured to guide washing water, which is used in the washing process, to the drum 15.

The glass holder 40 may include a holder body 41 with a circular-shaped plate in a central portion of which is hollow, a handgrip 42 formed at a front surface of the holder body 41 along a circumferential direction of the holder body 41, and a hinge coupling portion 43 formed at the front surface of the holder body 41 along the circumferential direction of the holder body 41 at a position facing the handgrip 42.

The hinge coupling portion 43 may include at least one accommodating recess 44 in which or to which the at least a portion of the hinge 100 is accommodated or coupled, and a coupling rib 45 protruding from the front surface of the holder body 41 by a predetermined length to allow the cover plate 60 to be coupled to the coupling rib 45.

The accommodating recess 44 may include a first accommodating recess **44*a* configured to accommodate a second arm 122 of the hinge 100 in a state in which the door 20 closes the opening 16, and a second accommodating recess 44*b* configured to accommodate a protrusion 130 of the hinge 100. The first accommodating recess 44*a* may be formed such that a portion of the holder body 41 is incised from an outside of the holder body 41 to an inside thereof by a predetermined length, and the second accommodating recess 44*b* may intersect and communicate with the first accommodating recess 44*a*. The first accommodating recess 44*a* may be provided in a direction approximately parallel to the ground and the second accommodating recess 44*b* may be provided in a direction approximately perpendicular to the first accommodating recess 44*a***.

The coupling rib 45 is formed to be long along the circumferential direction of the holder body 41 and protrudes from the front surface of the holder body 41 by a predetermined length to allow the cover plate 60 to be coupled to the coupling rib 45. Also, since the coupling rib 45 protrudes from the front surface of the holder body 41 by a predetermined length, rigidity of the hinge coupling portion 43, on which a load of the door 20 is concentrated while the door 20 is pivoted, is reinforced so the door 20 may be stably pivoted without drooping or damage.

The door cover 50 may form an exterior of the door 20 and may be coupled to the glass holder 40 to cover the front surface of the glass holder 40.

The door glass 30, the glass holder 40, and the door cover 50 may be injection-molded with a plastic material having a lightened weight and certain strength.

The cover plate 60 is provided in a shape corresponding to the coupling rib 45 and is coupled to the hinge coupling portion 43 in a direction parallel to an axial direction of the drum 15. The cover plate 60 may include a plurality of bent portions 61 formed such that an outer end of each of the plurality of bent portions 61 is bent to cover the hinge coupling portion 43, and a third accommodating recess 62 configured to accommodate a portion of each of the second arm 122 and the protrusion 130 at a position corresponding to each of the first accommodating recess **44*a* and the second accommodating recess 44*b* so as for the door 20 not to interfere with the second arm 122 and the protrusion 130 of the hinge 100 in a state in which the door 20 closes the opening 16**.

The third accommodating recess 62 may form an accommodating portion (not shown) configured to accommodate at least a portion of the hinge 100 in association with the first accommodating recess **44*a* and the second accommodating recess 44*b*. Specifically, the third accommodating recess 62 may accommodate the second arm 122 in association with the first accommodating recess 44*a* so as to prevent the cover plate 60 from interfering with the second arm 122, and may accommodate or support the protrusion 130 in association with the second accommodating recess 44*b* so as to allow the door 20 to be pivoted about the rotating axis 195**.

The hinge 100 may couple the door 20 to the cabinet 10 to allow the door 20 to be pivotable about the rotating axis 195.

The hinge 100 may include a hinge body 110. The hinge body 110 may be coupled to the cabinet 10. Specifically, the hinge body 110 may be coupled to a front surface of the cabinet 10 at an outside of the opening 16. That is, the hinge body 110 may be coupled to the front surface frame 11 at the outside of the opening 16.

The hinge body 110 may be provided as a plate formed to be long approximately along a circumferential direction of the door 20. Also, the hinge body 110 may include a plurality of fixing holes 111 to be fixed to the front surface of the cabinet 10, that is, the front surface frame 11.

The hinge 100 may further include at least one hinge arm 120. The at least one hinge arm 120 may extend from the hinge body 110.

The at least one hinge arm 120 may include a first arm 121 extending from the hinge body 110 toward a front side of the washing machine 1. That is, the first arm 121 may be formed to extend from a front surface of the hinge body 110 by a predetermined length.

The at least one hinge arm 120 may further include the second arm 122 extending from the first arm 121 and bent toward an outside of the washing machine 1.

According to another aspect, the at least one hinge arm 120 may include a first surface 123. The first surface 123 may face the cabinet 10. Specifically, the first surface 123 may face the front surface of the cabinet 10.

The at least one hinge arm 120 may further include a second surface 124. The second surface 124 may be directed downward in a rotating axis direction X.

The at least one hinge arm 120 may further include a third surface 125. The third surface 125 may be directed upward in the rotating axis direction X.

The at least one hinge arm 120 may further include a fourth surface 126. The fourth surface 126 may face the door 20.

The second surface 124 and the third surface 125 may respectively connect the first surface 123 and the fourth surface 126. Specifically, the second surface 124 may connect a lower end portion of the first surface 123 and a lower end portion of the fourth surface 126. The third surface 125 may connect an upper end portion of the first surface 123 and an upper end portion of the fourth surface 126.

The hinge 100 may further include at least one protrusion 130. The at least one protrusion 130 may be formed to protrude from the at least one hinge arm 120 in the rotating axis direction X. The at least one protrusion 130 may form the rotating axis 195.

The at least one protrusion 130 may include a first protrusion 131 and a second protrusion 132. The first protrusion 131 may be formed to protrude upward from the at least one hinge arm 120 in the rotating axis direction X. The second protrusion 132 may be formed to protrude downward from the at least one hinge arm 120 in the rotating axis direction X. Specifically, the first protrusion 131 may be formed to protrude upward from one end of the second arm 122 in the rotating axis direction X, and the second protrusion 132 may be formed to protrude downward from one end of the second arm 122 in the rotating axis direction X. That is, the first protrusion 131 and the second protrusion 132 may respectively extend upward and downward from the second arm 122 in the rotating axis direction X.

The hinge 100 may further include a wire guide portion 140 configured to guide the wire 400.

The wire guide portion 140 may be formed at the hinge 100. The wire guide portion 140 may be formed and recessed into the hinge 100 to allow the wire 400 to pass through the wire guide portion 140. In other words, the wire guide portion 140 may be formed and recessed into the hinge 100 to allow the wire 400 to be inserted into the wire guide portion 140.

The wire guide portion 140 may be formed at the at least one hinge arm 120. The wire guide portion 140 may be formed and recessed along at least one of one surface of the first arm 121 and one surface of the second arm 122. The wire guide portion 140 may be consecutively formed and recessed along the at least one of one surface of the first arm 121 and one surface of the second arm 122.

The wire guide portion 140 may be formed and recessed along at least a portion of the first surface 123.

The hinge 100 may further include a wire inlet 150. The wire inlet 150 may be formed to communicate with the wire guide portion 140 to allow the wire 400 to enter the wire guide portion 140. The wire inlet 150 may be formed on at least one of the at least one protrusion 130. That is, the wire inlet 150 may be formed on at least one of the first protrusion 131 and the second protrusion 132. Preferably, the wire inlet 150 may be formed at the second protrusion 132.

The hinge 100 may further include a wire outlet 160. The wire outlet 160 may be formed at one surface 112 of the hinge body 110, which faces the cabinet 10, to allow the wire 400 to exit from the wire guide portion 140. The wire outlet 160 may be formed to communicate with the wire guide portion 140 to allow the wire 400 to exit from the wire guide portion 140.

The hinge 100 may further include a hinge cover 170. The hinge cover 170 may be detachably coupled to the wire guide portion 140. The hinge cover 170 may serve to prevent foreign materials from flowing into the wire guide portion 140. Also, the hinge cover 170 may serve to prevent the wire 400 inserted into the wire guide portion 140 from being exposed to the outside. The hinge cover 170 may be detachably coupled to the wire guide portion 140 and form a portion of an exterior of the hinge 100. Thus, the hinge cover 170 detachably coupled to the wire guide portion 140 is used, and thus, while the wire 400 is inserted into the wire guide portion 140, a work may be performed in a state in which the hinge cover 170 is removed such that work performance may be improved, and, when the wire 400 has been inserted into the wire guide portion 140, the hinge cover 170 is coupled to the wire guide portion 140 such that the wire 400 may be stably accommodated in the wire guide portion 140.

The hinge cover 170 may include a cover body 171.

The hinge cover 170 may further include at least one coupling rib 172. The at least one coupling rib 172 may extend from the cover body 171. Preferably, the at least one coupling rib 172 may include a first coupling rib 172*a* extending upward from the cover body 171 in the rotating axis direction and a second coupling rib 172*b* extending downward from the cover body 171 in the rotating axis direction X.

The at least one coupling rib 172 may be coupled to at least one coupling recess 127 formed at the at least one hinge arm 120. The at least one coupling rib 172 may be fitted into and coupled to the at least one coupling recess 127. The at least one coupling recess 127 may be formed on a plane the same as one surface of the at least one hinge arm 120, at which the wire guide portion 140 is formed. As one example, when the wire guide portion 140 is formed at the first surface 123 of the at least one hinge arm 120, the at least one coupling recess 127 may also be formed at the first surface 123 of the at least one hinge arm 120.

The hinge cover 170 may further include at least one support rib 173. The at least one support rib 173 may extend from the cover body 171. The at least one support rib 173 may be hooked and coupled to one surface of the at least one hinge arm 120. The at least one support rib 173 may include a bent portion 174 with a bent shape to allow the hinge cover 170 to be coupled to the wire guide portion 140. As one example, when the wire guide portion 140 is formed at the first surface 123 of the at least one hinge arm 120, the at least one support rib 173 may extend downward from the cover body 171 in the rotating axis direction X, and, at this point, the bent portion 174 may be hooked and coupled to the second surface 124 of the at least one hinge arm 120. As another example, when the wire guide portion 140 is formed at the first surface 123 of the at least one hinge arm 120, the at least one support rib 173 may extend upward from the cover body 171 in the rotating axis direction X, and, at this point, the bent portion 174 may be hooked and coupled to the third surface 125 of the at least one hinge arm 120.

The hinge cover 170 may be stably coupled to the wire guide portion 140 by the at least one coupling rib 172 and the at least one support rib 173.

One end portion of the hinge cover 170 may form the wire inlet 150 in association with the at least one protrusion 130. Specifically, the at least one protrusion 130 may include an incised portion 175, and one end portion of the hinge cover 170 may be coupled to the incised portion 175 to form the wire inlet 150 in association with the at least one protrusion 130.

The other end portion of the hinge cover 170 may form a part of the wire outlet 160. In other words, the other end portion of the hinge cover 170 may form the wire outlet 160 in association with the hinge body 110.

The hinge 100 may further include at least one protrusion cover 180. The at least one protrusion cover 180 may be coupled to enclose the at least one protrusion 130. The at least one protrusion cover 180 may be detachably coupled to the at least one protrusion 130 to prevent abrasion or damage of the at least one protrusion 130 serving as the rotating axis 195.

The washing machine 1 may further include a fixing ring 190 coupled to the at least one protrusion 130. The fixing ring 190 may be coupled to enclose the at least one protrusion 130 from the outside. The fixing ring 190 may be coupled to the at least one protrusion 130 at which the wire inlet 150 is formed. The fixing ring 190 may have a cylindrical shape with an open bottom. However, the shape of the fixing ring 190 is not limited to the describe above, and may be variously modified. The fixing ring 190 may simultaneously enclose at least one protrusion forming the wire inlet 150 and one end portion of the hinge cover 170. The at least one protrusion 130 and the one end portion of the hinge cover 170 may be firmly coupled by the fixing ring 190.

The at least one hinge arm 120 may include a first hinge arm 128 positioned downward in the rotating axis direction X, and a second hinge arm 129 positioned upward in the rotating axis direction X. As shown in FIGS. 7 to 9, the wire guide portion 140 of the hinge 100 according to the first example may be formed at the first hinge arm 128. Specifically, the wire guide portion 140 of the hinge 100 according to the first example may be formed and recessed into the first surface 123 of the first hinge arm 128.

Figure 11:
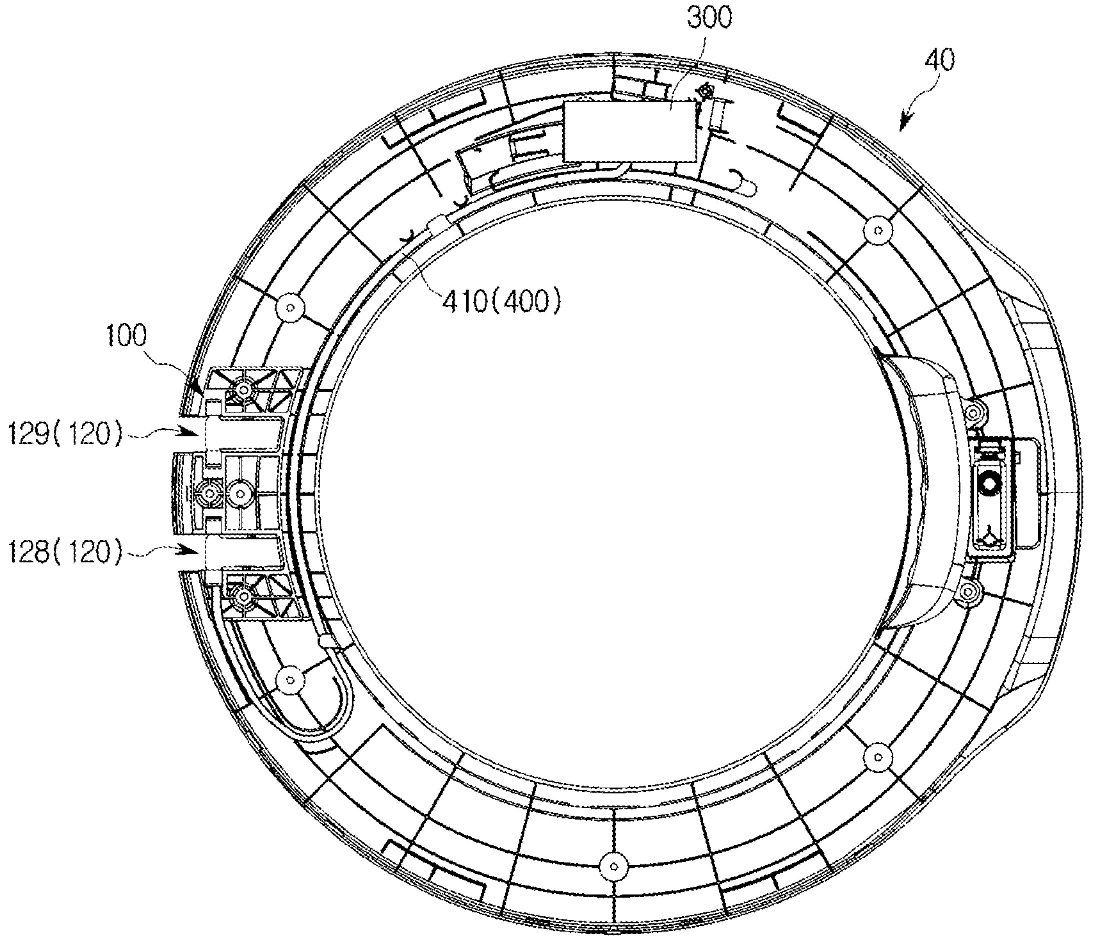
FIG. 11 is a diagram schematically illustrating the connection state of the wire when viewed from a front side of a glass holder in the washing machine according to one embodiment of the present disclosure.
Figure 12:
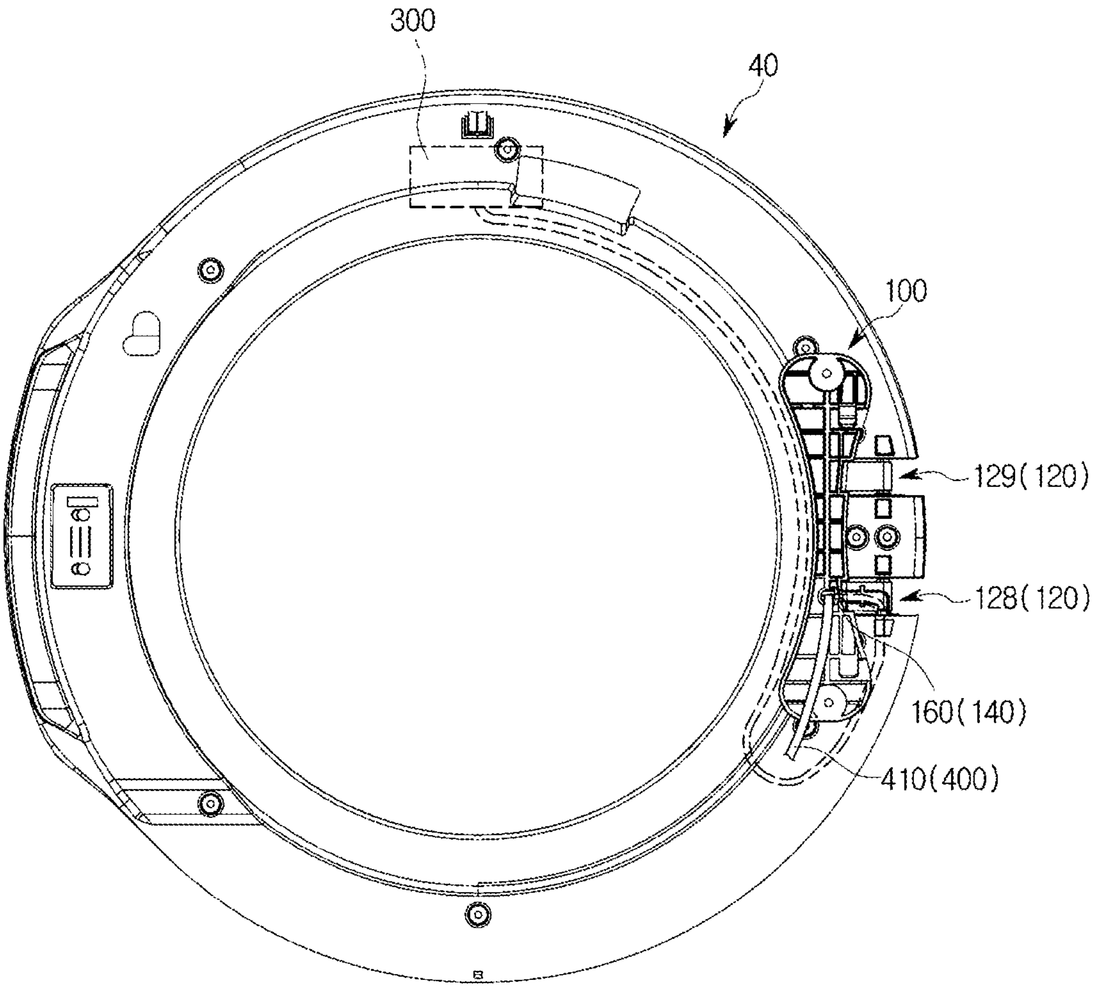
FIG. 12 is a diagram schematically illustrating the connection state of the wire when viewed from a rear side of the glass holder in the washing machine according to one embodiment of the present disclosure.

FIG. 10 is a diagram schematically illustrating a connection state of a wire in the washing machine according to one embodiment of the present disclosure, and FIG. 11 is a diagram schematically illustrating the connection state of the wire when viewed from a front side of a glass holder in the washing machine according to one embodiment of the present disclosure. FIG. 12 is a diagram schematically illustrating the connection state of the wire when viewed from a rear side of the glass holder in the washing machine according to one embodiment of the present disclosure. In FIG. 10, the wire 400 disposed inside the washing machine 1 is illustrated by a solid line to help understanding of the present disclosure.

As shown in FIGS. 10 to 12, the wire 400 may pass through the hinge 100. Specifically, one end portion of the wire 400, which passes through the hinge 100, may be positioned inside the door 20, and the other end portion of the wire 400, which passes through the hinge 100, may be positioned inside the cabinet 10.

The wire 400 may be electrically connected to an electrical component. In other words, the wire 400 may electrically connect the first electrical component 200 and the second electrical component 300.

The wire 400 may include a first wire 410 and a second wire 420 connected to the first wire 410. The first wire 410 may pass through the hinge 100 to be connected to the second wire 420. One end portion of the first wire 410 may be connected to the second electrical component 300 provided inside the door 20, and the other end portion of the first wire 410 may be connected to the second wire 420. In other words, the first wire 410 and the second wire 420 may be connected to each other through coupling between a connector 411 provided at the other end portion of the first wire 410 and a connector 421 provided at a one end portion of the second wire 420. The coupling between the first wire 410 and the second wire 420 may be made inside the cabinet 10. The second wire 420 may include a main wire harness.

While the first electrical component 200 and the second electrical component 300 are connected, at least a portion of the wire 400 may be disposed along the circumferential direction of the door 20. As one example, at least a portion of the wire 400 positioned inside the door 20 may be disposed along the circumferential direction of the door 20.

A through-hole 10*a* (See, FIG. 4) may be formed at the cabinet 10. Specifically, the through-hole 10*a* may be formed at one surface of the cabinet 10 to which the hinge body 110 is coupled, that is, at the front surface of the cabinet 10. The wire 400 passing through the hinge 100 may pass through the through-hole 10*a* to enter the cabinet 10.

The wire 400 connected to the second electrical component 300 reaches the hinge 100, and the wire 400 reaching the hinge 100 passes through the hinge 100 to be connected to the first electrical component 200 provided inside the cabinet 10. In other words, the one end portion of the wire 400 may be connected to the second electrical component 300, and the other end portion thereof may pass through the hinge 100 to be connected to the first electrical component 200. As described above, since the first electrical component 200 and the second electrical component 300 may be electrically connected by the wire 400 passing through the hinge 100, it may be prevented that most of the wire 400 is exposed to the outside to hinder an aesthetic beauty of the washing machine 1.

The wire 400 connected to the second electrical component 300 provided at the door 20 reaches the hinge 100 along the circumferential direction of the door 20. The wire 400 reaching the hinge 100 is inserted into the wire guide portion 140 through the wire inlet 150. The wire 400 inserted into the wire guide portion 140 passes through the wire outlet 160 and the through-hole 10*a*, which is provided at the one surface of the cabinet 10 to correspond to the wire outlet 160, to exit inside the cabinet 10. The wire 400 exiting from the cabinet 10 is connected to the first electrical component 200 provided inside the cabinet 10.

Figure 13:
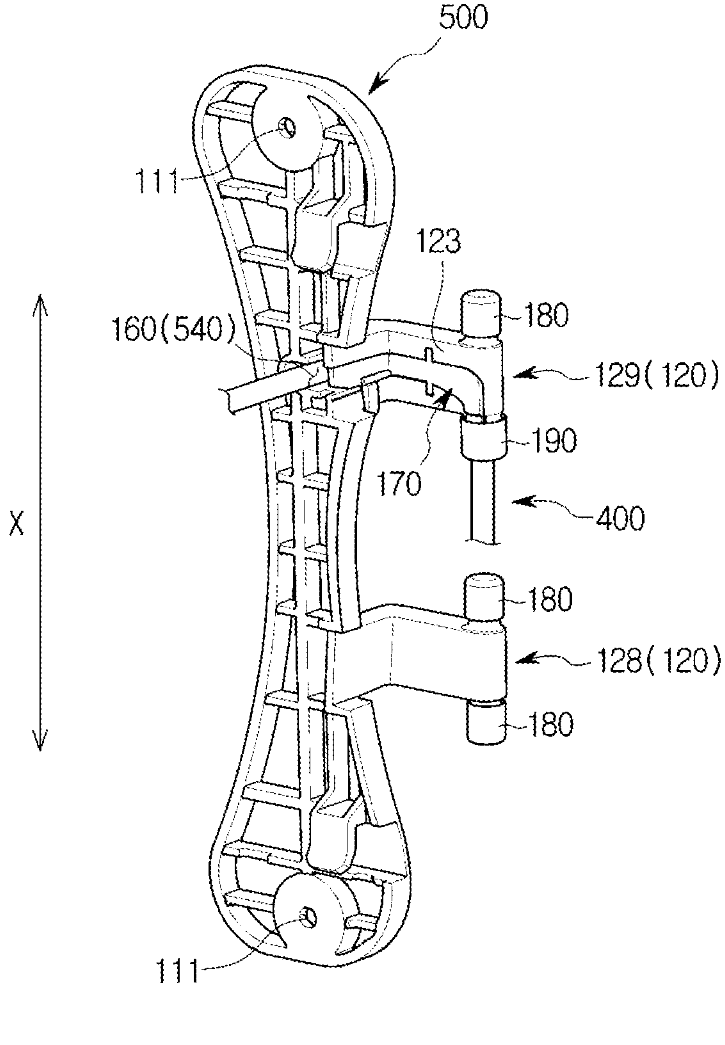
FIG. 13 is a diagram illustrating a coupling structure of a hinge according to a second example in the washing machine according to one embodiment of the present disclosure.

FIG. 13 is a diagram illustrating a coupling structure of a hinge according to a second example in the washing machine according to one embodiment of the present disclosure. Hereinafter, a description overlapping with that of the hinge 100 according to the first example will be omitted.

As shown in FIG. 13, a wire guide portion 540 of a hinge 500 according to a second example may be formed at the second hinge arm 129 positioned upward in the rotating axis direction X. Specifically, the wire guide portion 540 of the hinge 500 according to the second example may be formed and recessed into the first surface 123 of the second hinge arm 129.

Figure 14:
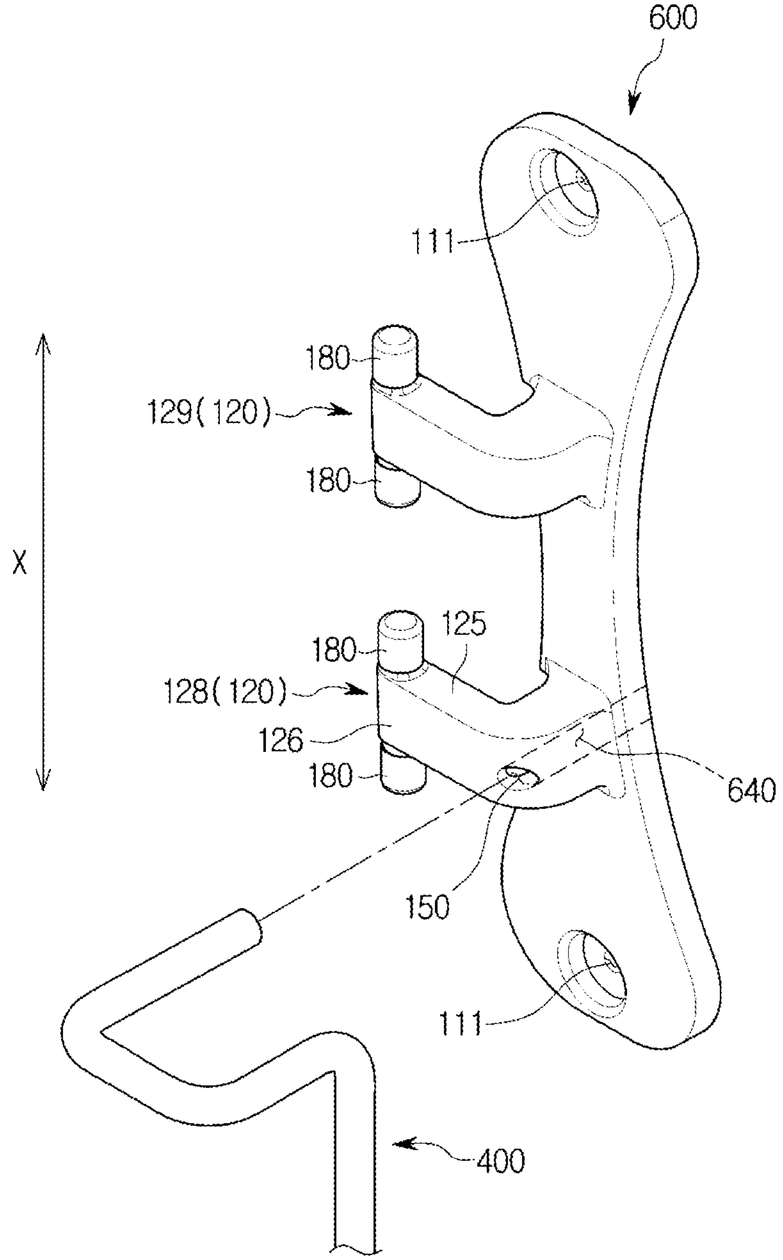
FIG. 14 is a diagram illustrating a coupling structure of a hinge according to a third example in the washing machine according to one embodiment of the present disclosure.

FIG. 14 is a diagram illustrating a coupling structure of a hinge according to a third example in the washing machine according to one embodiment of the present disclosure. Hereinafter, a description overlapping with that of the hinge 100 according to the first example will be omitted.

As shown in FIG. 14, a wire guide portion 640 may be formed to pass through a hinge 600. In other words, the wire guide portion 640 may be formed at the hinge 600 in a form of a hole to allow the wire 400 to pass through the wire guide portion 640.

Specifically, the wire guide portion 640 may be formed to pass through the at least one hinge arm 120. The wire guide portion 640 may be formed to pass through the at least one hinge arm 120 in a direction approximately perpendicular to the rotating axis 195. The wire inlet 150 may be formed at the fourth surface 126 of the at least one hinge arm 120. The wire outlet 160 may be formed at the one surface 112 of the hinge body 110, which faces the cabinet 10. The wire inlet 150 and the wire outlet 160 may be formed to communicate with the wire guide portion 640.

FIG. 14 illustrates a case in which the wire guide portion 640 is formed at the first hinge arm 128, but the wire guide portion 640 may be formed on at least one of the first hinge arm 128 and the second hinge arm 129.

Figure 15:
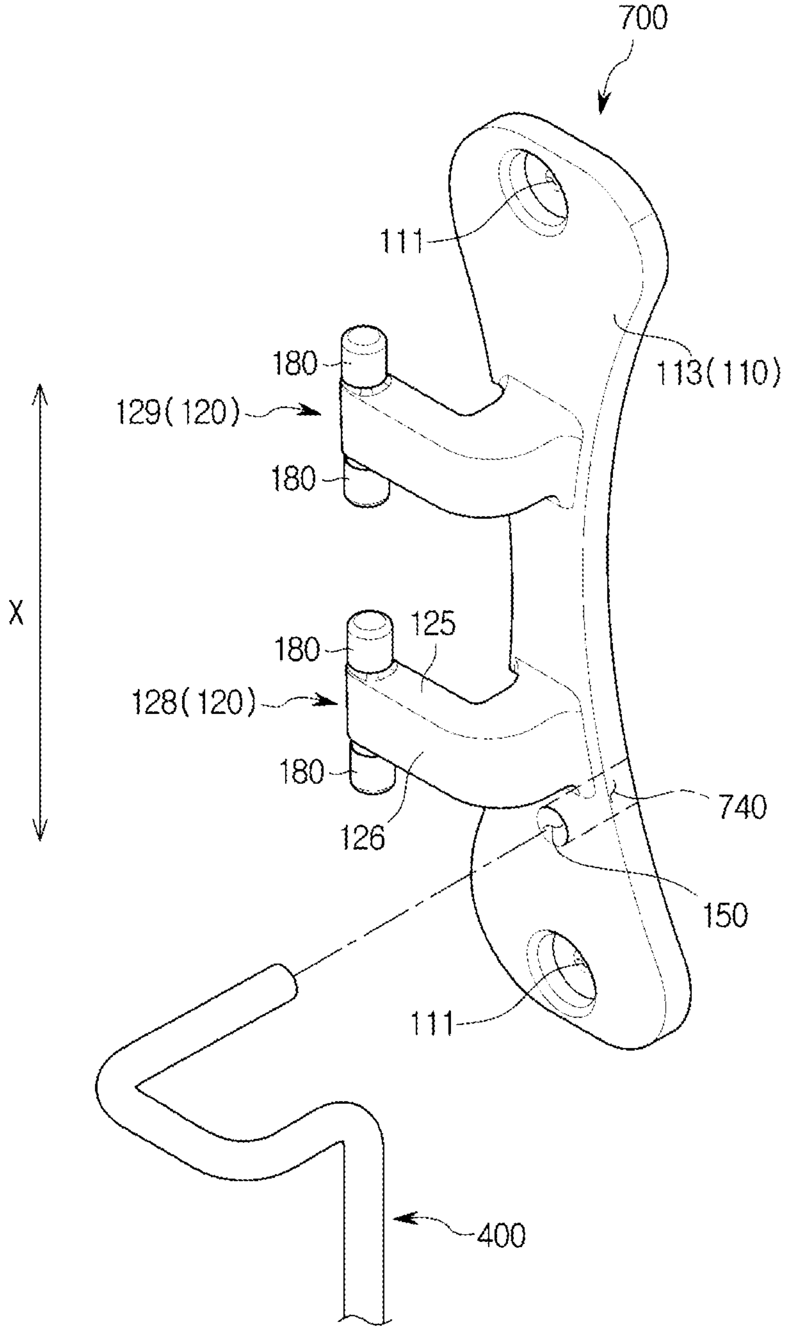
FIG. 15 is a diagram illustrating a coupling structure of a hinge according to a fourth example in the washing machine according to one embodiment of the present disclosure.

FIG. 15 is a diagram illustrating a coupling structure of a hinge according to a fourth example in the washing machine according to one embodiment of the present disclosure. Hereinafter, a description overlapping with that of the hinge 100 according to the first example will be omitted.

As shown in FIG. 15, a wire guide portion 740 may be formed to pass through a hinge 700. In other words, the wire guide portion 740 may be formed at the hinge 700 in a form of a hole to allow the wire 400 to pass through the wire guide portion 740.

Specifically, the wire guide portion 740 may be formed to pass through the hinge body 110. The wire guide portion 740 may be formed to pass through the hinge body 110 in a direction approximately perpendicular to the rotating axis 195. The wire inlet 150 may be formed at one surface 113 of the hinge body 110, which faces the door 20. The wire outlet 160 may be formed at the one surface 112 of the hinge body 110, which faces the cabinet 10. The wire inlet 150 and the wire outlet 160 may be formed to communicate with the wire guide portion 740.

FIG. 15 illustrates a case in which the wire guide portion 740 is formed below the first hinge arm 128, but the wire guide portion 740 may be formed between the first hinge arm 128 and the second hinge arm 129, or over the second hinge arm 129.

Figure 16:
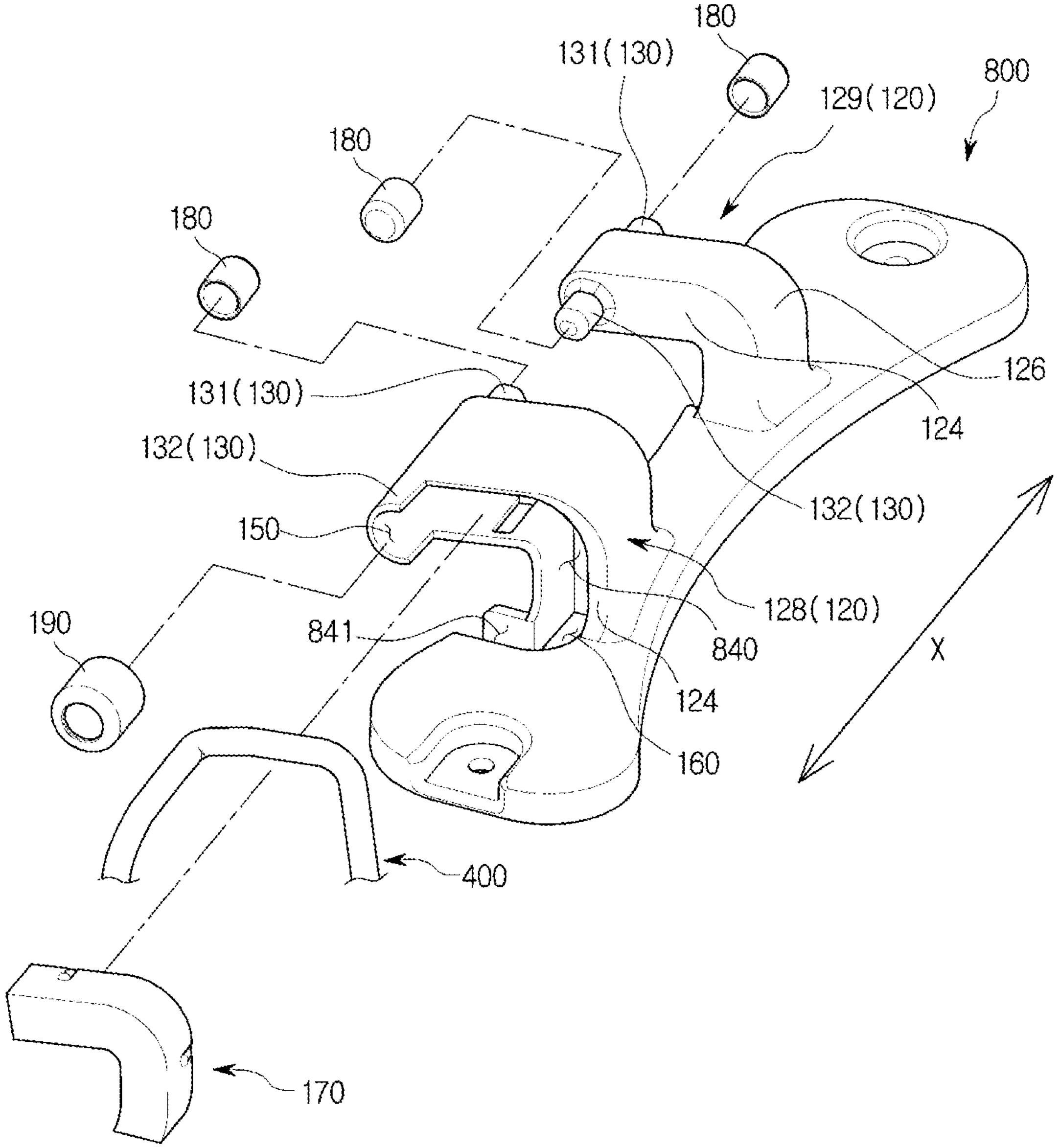
FIG. 16 is an exploded perspective view illustrating a hinge according to a fifth example in the washing machine according to one embodiment of the present disclosure.
Figure 17:
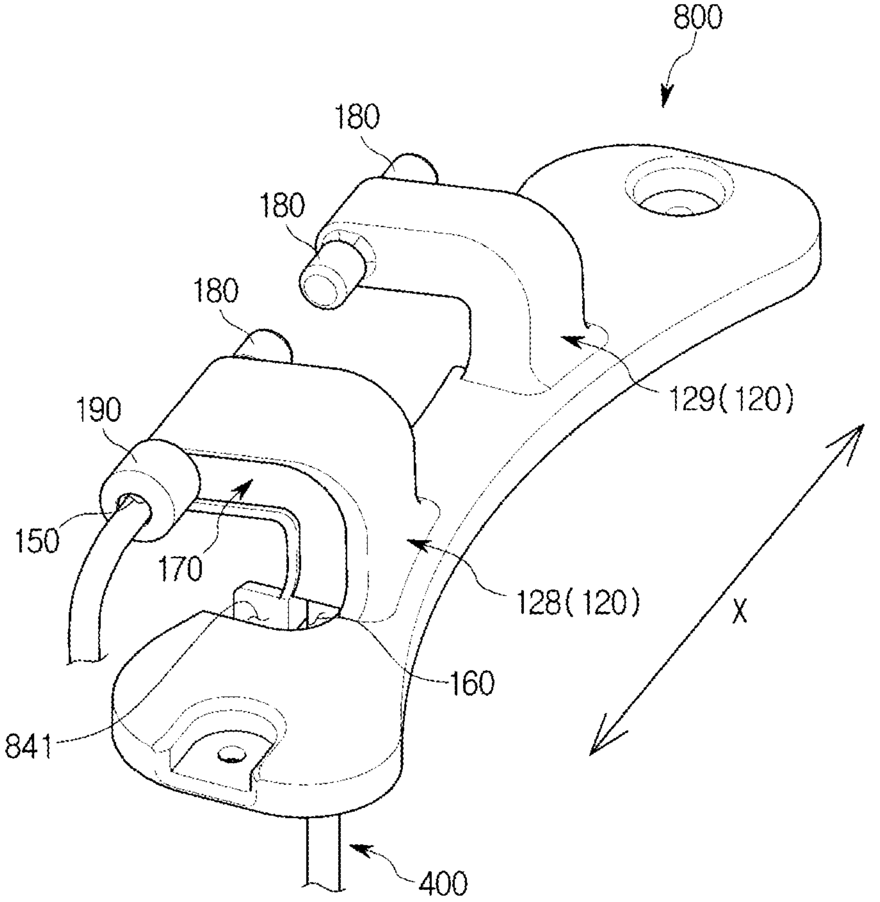
FIG. 17 is a diagram illustrating a coupling structure of the hinge according to the fifth example in the washing machine according to one embodiment of the present disclosure.

FIG. 16 is an exploded perspective view illustrating a hinge according to a fifth example in the washing machine according to one embodiment of the present disclosure, and FIG. 17 is a diagram illustrating a coupling structure of the hinge according to the fifth example in the washing machine according to one embodiment of the present disclosure. Hereinafter, a description overlapping with that of the hinge 100 according to the first example will be omitted.

As shown in FIGS. 16 and 17, a wire guide portion 840 may be formed and recessed into a hinge 800 to allow the wire 400 to be inserted into the wire guide portion 840. Specifically, the wire guide portion 840 may be formed and recessed into the at least one hinge arm 120.

The wire guide portion 840 may be formed and recessed along at least a portion of the second surface 124 of the at least one hinge arm 120, wherein the at least a portion is directed downward in the rotating axis direction X.

The wire inlet 150 may be formed at the at least one protrusion 130. Specifically, the at least one protrusion 130 may include the incised portion 175, and the one end portion of the hinge cover 170 may be coupled to the incised portion 175 to form the wire inlet 150 in association with the at least one protrusion 130.

The wire outlet 160 may be formed at the one surface 112 of the hinge body 110, which faces the cabinet 10, to allow the wire 400 to exit from the wire guide portion 840.

The wire inlet 150 and the wire outlet 160 may be formed to communicate with the wire guide portion 840.

The hinge 800 may further include an additional wire outlet 841. The additional wire outlet 841 may be formed at a side surface of the hinge body 110. Specifically, the additional wire outlet 841 may be formed at one side surface of the hinge body 110, which is directed to the rotating axis 195. The additional wire outlet 841 may also be formed to communicate with the wire guide portion 840.

The wire 400 is inserted into the wire inlet 150 to be directed upward in the rotating axis direction X. The wire 400 inserted into the wire inlet 150 is moved toward an inside of the cabinet 10 in a direction approximately perpendicular to the rotating axis direction X. In other words, the wire 400 inserted into the wire inlet 150 is moved toward the inside of the cabinet 10 along one surface of the second arm 122. Thereafter, the wire 400 is moved toward the rear side of the washing machine 1. In other words, the wire 400 is moved toward the rear side of the washing machine 1 along one side of the first arm 121. The wire 400, which is moved toward the rear side of the washing machine 1 along the one side of the first arm 121, may pass through the wire outlet 160 or the additional wire outlet 841 to enter the cabinet 10. After the wire 400 is inserted into the wire guide portion 840, the hinge cover 170 may be detachably coupled to the wire guide portion 840.

As shown in FIGS. 16 and 17, the wire guide portion 840 may be formed and recessed into the first hinge arm 128. Specifically, the wire guide portion 840 may be formed and recessed along at least a portion of the second surface 124 of the first hinge arm 128.

Figure 18:
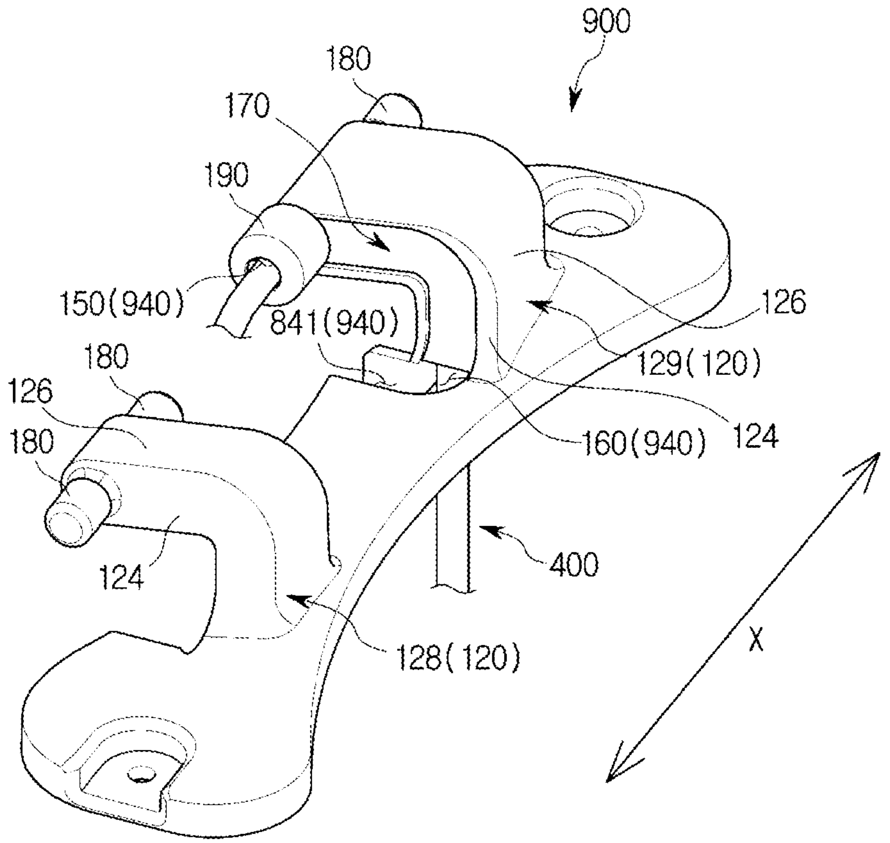
FIG. 18 is a diagram illustrating a coupling structure of a hinge according to a sixth example in the washing machine according to one embodiment of the present disclosure.

FIG. 18 is a diagram illustrating a coupling structure of a hinge according to a sixth example in the washing machine according to one embodiment of the present disclosure. Hereinafter, descriptions overlapping with those of the hinge 100 according to the first example and the hinge 800 according to the fifth example will be omitted.

As shown in FIG. 18, a wire guide portion 940 of a hinge 900 may be formed and recessed into the second hinge arm 129. Specifically, the wire guide portion 940 may be formed and recessed along at least a portion of the second surface 124 of the second hinge arm 129.

Hereinbefore, specific embodiments are shown and described. However, the present disclosure is not limited to these specific embodiments, and various modified embodiments can be devised from those skilled in the art without departing from the gist of a technical spirit that is defined by the appended claims.

What is claims is:

1. A washing machine comprising:
- a cabinet having an opening at a front side;
- a drum rotatably disposed inside the cabinet;
- a door configured to open or close the opening;
- a hinge configured to pivotably couple the door to the cabinet; and
- a wire extending from an inside of the cabinet to the door,
- wherein the hinge comprises:
  - a hinge body coupled to the cabinet,
  - a first hinge arm,
  - a second hinge arm that is spaced apart from the first hinge arm along a direction of a rotating axis, and
  - a wire guide portion formed at the first hinge arm to accommodate the wire,
- wherein the first hinge arm includes a first surface facing the second hinge arm and a second surface opposite the first surface, and
- wherein the wire guide portion is formed to be recessed at the second surface.

2. The washing machine of claim 1, wherein the hinge further comprises a protrusion protruding from the first hinge arm to form the rotating axis of the door.

3. The washing machine of claim 2, wherein the hinge further comprises a hinge cover coupled to the first hinge arm and the protrusion to cover the wire guide portion.

4. The washing machine of claim 3, wherein the hinge further comprises a fixing ring configured to enclose the protrusion and an end portion of the hinge cover to couple the end portion of the hinge cover to the protrusion.

5. The washing machine of claim 4, wherein the wire passes through the fixing ring.

6. The washing machine of claim 4, wherein the protrusion includes an incised portion extending from the first hinge arm along an exterior surface of the protrusion.

7. The washing machine of claim 6, wherein the door includes an accommodating recess configured to accommodate the fixing ring enclosing the protrusion and the end portion of the hinge cover.

8. The washing machine of claim 7, wherein the accommodating recess allows the fixing ring to rotate about the rotation axis of the protrusion.

9. The washing machine of claim 7, wherein the wire passes through the accommodating recess when the fixing ring is inserted to provide power to an electrical component in the door.

10. The washing machine of claim 6, wherein the end portion of the hinge cover completes an outer circumference of the protrusion at the incised portion.

11. The washing machine of claim 2, wherein the protrusion includes an incised portion extending from the first hinge arm along an exterior surface of the protrusion.

12. The washing machine of claim 11, wherein the incised portion forms a wire inlet together with an end portion of the hinge cover.

13. The washing machine of claim 2, wherein the protrusion includes:
- a first protrusion formed to protrude in a first direction from the first hinge arm, and
- a second protrusion formed to protrude in a second direction opposite to the first direction.

14. The washing machine of claim 13, wherein the hinge further includes a protrusion cover configured to be coupled to the second protrusion to protect the second protrusion.

15. The washing machine of claim 1, wherein the first hinge arm extends from the hinge body toward the front side of the cabinet.

16. The washing machine of claim 1, wherein the wire is disposed in the recessed wire guide portion.

17. The washing machine of claim 1, further comprising:
- a first electrical component provided at the cabinet; and
- a second electrical component provided at the door,
- wherein the wire connects the first electrical component and the second electrical component.

18. The washing machine of claim 1, wherein a wire outlet is formed at one surface of the hinge body to allow the wire to exit from the wire guide portion.

19. The washing machine of claim 18, wherein:
- the cabinet includes a through-hole, and
- the wire exiting from the wire outlet passes through the through-hole to enter the cabinet.

20. The washing machine of claim 18, wherein the wire outlet is spaced apart from at least one of the first hinge arm or the second hinge arm.

* * * * *